US 6,614,731 B2

(12) United States Patent
Ishii

(10) Patent No.: US 6,614,731 B2
(45) Date of Patent: Sep. 2, 2003

(54) METHOD AND APPARATUS FOR RECORDING MAGNETIC DOMAIN HAVING AN ARC SHAPE CONVEX IN A FORWARD SCANNING DIRECTION OF A MAGNETO-OPTICAL RECORDING MEDIUM

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/781,221

(22) Filed: Feb. 13, 2001

(65) Prior Publication Data

US 2001/0048644 A1 Dec. 6, 2001

(30) Foreign Application Priority Data

Feb. 16, 2000 (JP) ........................................ 2000-038448

(51) Int. Cl.[7] .............................................. G11B 11/00
(52) U.S. Cl. .................................. 369/13.54; 369/13.47
(58) Field of Search ........................... 369/13.54, 13.14, 369/13.16, 13.55, 13.06, 13.08, 13.09, 13.47, 13.52; 428/694 ML

(56) References Cited

U.S. PATENT DOCUMENTS

| 5,317,555 A | * | 5/1994 | Takahashi et al. ....... 369/13.54 |
| 5,377,055 A | | 12/1994 | Ishii ............................. 360/59 |
| 5,485,433 A | | 1/1996 | Satomura et al. ............. 369/13 |
| 5,523,986 A | | 6/1996 | Ishii ............................. 369/13 |
| 5,550,796 A | | 8/1996 | Ishii ............................. 369/13 |
| 5,559,763 A | | 9/1996 | Ishii ............................. 369/13 |
| 5,563,853 A | | 10/1996 | Ishii ............................. 369/13 |
| 5,579,293 A | | 11/1996 | Ishii ............................. 369/13 |
| 5,586,091 A | | 12/1996 | Ishii et al. ..................... 369/13 |
| 5,615,183 A | | 3/1997 | Ishii ............................. 369/13 |
| 5,661,612 A | | 8/1997 | Hasegawa et al. ............. 360/59 |
| 5,687,141 A | | 11/1997 | Ishii ............................. 369/13 |
| 5,689,478 A | | 11/1997 | Ishii et al. ..................... 369/13 |
| 5,703,839 A | | 12/1997 | Ishii ............................. 369/13 |
| 5,986,976 A | | 11/1999 | Ishii ............................. 369/13 |
| 5,991,242 A | | 11/1999 | Ishii ............................. 369/13 |
| 6,027,825 A | | 2/2000 | Shiratori et al. ............. 428/694 |
| 6,041,024 A | | 3/2000 | Ishii ............................. 369/13 |
| 6,069,852 A | * | 5/2000 | Miyaoka et al. ............. 369/13 |
| 6,125,083 A | | 9/2000 | Nishimura et al. ........... 369/13 |
| 6,177,175 B1 | * | 1/2001 | Hashimoto .................. 428/141 |
| 6,249,489 B1 | * | 6/2001 | Fujii et al. .................... 369/13 |
| 6,298,015 B1 | * | 10/2001 | Ishii et al. .................... 369/13 |
| 6,424,602 B1 | * | 7/2002 | Fujii ....................... 369/13.09 |

FOREIGN PATENT DOCUMENTS

| JP | 6-290496 | 10/1994 |
| JP | 7-334877 | 12/1995 |

* cited by examiner

Primary Examiner—Tan Dinh
(74) Attorney, Agent, or Firm—Fitzpatrick, Cella, Harper & Scinto

(57) ABSTRACT

To provide an information recording method, an information recording apparatus and an information reproducing method and an apparatus for a domain wall mobile type magneto-optical medium. In the information recording method, a light beam scans on the medium for heating and at the same time a magnetic field modulated corresponding to the information is applied to a heated point, and a recording magnetic domain having an arc shaped magnetic domain wall bending convex in a forward direction of an operation of the light beam is formed so that the information is recorded. The information recording apparatus, includes an optical head to radiate the light beam for executing the information, a magnetic head to generate a magnetic field modulated corresponding to the information, and a unit for causing the optical head, the magnetic head and the medium to relatively move.

3 Claims, 11 Drawing Sheets

METHOD AND APPARATUS FOR RECORDING MAGNETIC DOMAIN HAVING AN ARC SHAPE CONVEX IN A FORWARD SCANNING DIRECTION OF A MAGNETO-OPTICAL RECORDING MEDIUM

BACKGROUND OF THE INVENTION

1. Field of the Invention

The present invention relates to an information recording method, recording apparatus, reproducing method and reproducing apparatus which scans with heating means recording tracks configured by perpendicular magnetic anisotropy substance and stores information signals by applying a magnetic field to a heated region of the recording tracks.

2. Related Background Art

Various method for reproducing information signals recorded in magnetic recording media are conventionally known. In particular, the present applicant discloses a domain wall displacement type reproducing method in Japanese Patent Application Laid-Open No. 6-290496. This method is characterized by recording on tracks of a magneto-optical medium information signals that are formed by a magnetic domain wall, applying a driving power to this magnetic domain wall so as to rapidly move (displace) the magnetic domain wall, and detecting that movement so as to reproduce the information signals. This method enables recording/reproducing of the information signals with extremely high storing density and high resolution capability.

A method of recording information signals into a magneto-optical medium and a reproducing method for reproducing the information signals by a magnetic wall displacement method will be described below as follows.

FIGS. 10A and 10B are partially enlarged views showing a configuration of a magneto-optical medium 1, where FIG. 10A is a longitudinal section view and FIG. 10B is a plan view. Here, the magneto-optical medium 1 includes a substrate 2 which is configured by a transparent resin material, such as polycarbonate, etc., and is shaped as a belt so that a groove G and a land L are alternately formed in parallel, a magnetic layer 3 formed on the substrate 2 and configured by a perpendicular magnetic anisotropy substance, and a protection coat 4 configured by ultraviolet hardened resin. The magnetic layer 3 formed on the land L forms a belt-shape recording track RT on which information signals are recorded. The magnetic layer 3 is configured by laminating three layers made of a perpendicular magnetic anisotropy substance, a rare earth material such as, for example, Tb, Gd and Dy, and a transition metal such as Fe and Co, etc.; that is, a displacement layer 3a, a switching layer 3b, and a memory layer 3c. Here, the displacement layer 3a is a perpendicular magnetic anisotropy film having magnetic domain wall coercively which is smaller than memory layer 3c and a large magnetic wall movement, the switching layer 3b is a perpendicular magnetic anisotropy substance film having a curie temperature lower than the domain wall displacement layer 3a and the memory layer 3c, and the memory layer 3c is a perpendicular magnetic anisotropy film.

In addition, with a method such as radiating highly powered laser beams locally for heating, etc., a magnetic feature of the magnetic layer 3 on a bottom surface and a side surface of a groove G has been reduced (for example, deterioration of the perpendicular magnetic anisotropy). This weakens magnetic coupling between the recording track RT and a region in which the magnetic feature on its side surfaces has been reduced.

Next, a method to implement thermal magnetic recording information signals to the above-described magnetic recording media 1 with a storing apparatus will be described. The recording apparatus comprises driving means for an optical head, a magnetic head and magneto-optical medium 1. FIGS. 8A and 8B are partially enlarged views of the magneto-optical medium 1, showing a recording method of information signals, where FIG. 8A is a cross-sectional view, and FIG. 8B is a plan view as viewed from the direction of a lower surface. At the time when information signals are recorded, the optical head implements radiation by concentrating a highly powered recording light beam 7 which constitutes heating means for heating a recording track RT through a substrate 2. At the same time, the driving means drives the magneto-optical medium 1, whereby the recording light beam 7 scans the recording track RT in the direction indicated by an arrow A. A temperature of a magnetic layer 3 increases with radiation of the recording light beam 7, and in the periphery of the radiation region of the recording light beam 7 a thermal distribution, shown by isothermal lines in FIG. 8B is formed. Here, a reference numeral 8 denotes an isothermal line of a temperature Tc approximately equal to the curie temperature of the magnetic storing layer 3c.

Radiation of the light beam 7 by way of an optical head occurs concurrently with the application of a perpendicular magnetic field by the magnetic head, where the direction of the magnetic field is varied upward and downward relative to the radiation region of the recording light beam 7 in accordance with information signals. The memory layer 3c loses magnetization when it passes the front portion of the isothermal line B as a result of its temperature being not less than the curie temperature To, which permits magnetization thereof in the same direction as the magnetic field applied at the time when it passes the back portion of the isothermal line 8 as a result of its temperature being not more than Tv. Moreover, as it moves in a direction more remote from the back portion of the isothermal line 8, the temperature drops while coercively increases, so that the above-described applied magnetization is fixed. Thus, magnetization regions having alternating magnetization in the upward direction and in the downward direction, corresponding with the alternating direction of the applied magnetic livid, are formed in the storing back RT, as shown by arrows in the upward and downward directions in FIG. 8A; in the boundary portion between each magnetization region and the preceding and following magnetization regions, magnetic domain walls W1, W2, W3, W4, W5 and W6 are formed. These magnetic domain walls, which are fanned along the back portion of the isothermal line 5, have an arc shape which bends convexly in the direction opposite from the scanning direction (arrow A) of the light beam 7. In addition, the displacement layer 3a, the switching layer 3b, and the memory layer 3c are mutually brought into exchange coupling so that magnetization and the magnetic domain walls W1, W2, W3, W4, W5 and W6 are transfer-formed onto the displacement layer 3a and the switching layer 3b as well.

The thermal magnetic storing method as described above is referred to as a magnetic field modulation storing method, and can form magnetic walls at an interval shorter than the concentration diameter of the light beam, and therefore is suitable to store information signals at high density.

Next, a method for reproducing information signals from the above-described magneto-optical medium 1 with a reproducing apparatus will be described. The reproducing apparatus comprises driving means for an optical head and magneto-optical medium 1. FIGS. 9A and 9B are partially enlarged views of the magneto-optical medium 1 showing a reproducing method of information signals by way of a displacement layer system, where FIG. 9A is a cross-section view, and FIG. 9B is a plan view as viewed from the direction of a lower surface. At the time when information signals are reproduced, the optical bead implements radiation by concentrating a low power reproducing light beam 9 to a recording back WE through a substrate 2. At the same time, the driving means drives the magneto-optical medium 1, whereby the reproducing light beam 9 scans the recording track RT in the direction indicated by an arrow A. A temperature of a magnetic layer 3 increases with radiation of the light reproducing light beam 9, and in the periphery of the radiation region of the reproducing light beam 9 a thermal distribution, shown by isothermal lines in FIG. 9B, is formed. Here, a reference numeral 30 denotes an isothermal line of a temperature T approximately equal to the curie temperature Ts of the switching layer 3b, and a reference character Xp denotes a position of peak temperature. As described later, in the displacement layer 3a of the recording track RT, the magnetic domain wall is movable only in a region of temperature not less than Ts, that is, a region surrounded by the isothermal line 30; in other regions, movement of a magnetic domain wail is impossible.

Here, in a position sufficiently remote from the radiation region of the reproducing light beam 9, the temperature of the magnetic layer 3 is low and in this position, the displacement layer 3a, the switching layer 3b, and the magneto-optical layer 3c have mutually undergone exchange coupling, and magnetization and magnetic domain wall(s) formed in the magnetic storing layer 3c have been transfer-formed in the switching layer 3b and the displacement layer 3a. In addition, since the temperature distribution is approximately uniform, a driving power sufficient to move the magnetic domain wall transcribed into the displacement layer 3a is not present, and therefore the magnetic domain wall remains fixed. However, as the location draws closer to the radiation region of the reproducing light beam 9, the temperature of the magnetic layer 3 increases, and is subject to passing the forefront portion of the isothermal line 30, where the temperature of the switching layer 3b reaches a temperature not less than Ts, sufficient to cancel magnetization. Thus, since exchange coupling among the displacement layer 3a, the switching layer 3b, and the magnetic memory layer 3c is cut in a region surrounded by the isothermal line 30 higher than Ts, and magnetic coupling between the displacement layer 3a and a region in which both side surfaces of the recording track RT is weakened, the magnetic domain wall will become movable without being restricted. Moreover, since the surrounding temperature is inclined, the driving power will act on the magnetic domain wall in the direction of higher temperature, that is, of lower energy. Thus, the magnetic domain wall (W1 in FIGS. 9A and 9B) which has passed through the forefront portion of the isothermal line 30 moves rapidly toward a position Xp, whose temperature reaches the peak temperature, as shown by arrow B in the displacement layer 3a. Incidentally, in FIG. 9B, the magnetic domain wall W1 prior to movement is indicated by a broken line. Accompanied by movements of this magnetic domain wall, a magnetization region Mex having magnetization in one direction (the downward direction in the example as drawn) is extended and formed. Incidentally, magnetic memory layer 3c is configured by a material having a small degree of displacement of domain wall mobility, and therefore thee magnetic domain wall does not move in the magnetic memory layer 3c.

Thus, the magnetic domain walls W1, W2, ... W6 successively move toward the position Xp (displace) at respective times when they pass the forefront portion of the isothermal line 30, and each time a respective magnetization region Mex, which alternately has magnetization upward or downward, and is extended in the direction of scanning, is formed. A polarization direction of the reflecting light of the reproducing light beam 9 from this magnetization region Mex is rotated in accordance with the direction of magnetization of the magnetization region Ma due to magneto-optics effect (Kerr effect). Rotation of such polarization is detected using an optical head. The detected signal includes changes in the signal corresponding to movement of the magnetic domain walls, where the magnetic domain wall(s) form information signal domain(s) at position(s) corresponding to the information signal to be stored, and whereby the information signal can be reproduced based on the timing of changes in the reproduced signals.

Problems in recording and reproduction of information signals by way of combination of the above-described conventional magnetic field modulation storing system ad magnetic domain wall mobile reproducing system will be described below.

As described with reference to FIGS. 9A and 9B, according to the magnetic domain wall mobile reproducing system, when the magnetic domain wall passes the forefront of the isothermal line 30, it is no longer restrained by exchange coupling, and moreover temperature inclination generates a driving power that acts to start movement. Incidentally, as shown in FIG. 8B, according to the magnetic field modulation recording system, the magnetic domain wall is formed along the back portion of the isothermal line 8, and thus its shape will be a bent arc that is shaped convex in the direction opposite from the scanning direction (arrow A) of the recording light beam 7, That is, since the scanning direction of the recording light beam and the scanning direction of the reproducing light beam are normally the same, the bending direction of the formed magnetic domain wall is opposite from the bending direction of the forefront portion of the isothermal line 30 at the time of reproduction, as shown in FIG. 9B. Accordingly, as understood with reference to FIG. 9B, at the time of information reproduction, the magnetic domain wall passes the forefront portion of the isothermal line 30 gradually (from the central portion of the arc to the respective end portions of the arc). Thus, the entire magnetic domain wall will not become movable at a single time, and the driving power will not act evenly over the entire arc portion, whereby the start time of the magnetic domain wall movement (displacement) is apt to vary. As a result thereof, jitter of detected signals increases, making exact reproduction of information signals impossible.

In addition, in the case where the forming interval between two magnetic domain walls is short, before both ends of the first magnetic domain wail have passed the forefront portion of the isothermal line 30, the central portion of the subsequent magnetic wall moving layer passes the forefront portion of the isothermal line 30. As a result thereof, signal detection by separating signal changes corresponding with movement of continuous magnetic domain walls becomes impossible, and detection resolution capability drops.

SUMMARY OF THE INVENTION

Objects of the present invention are to provide an information recording method, as well as an apparatus, for forming a recording magnetic domain baying magnetic domain walls movable evenly and all together, and to provide a method, as well as apparatus, for reproducing the above-described recording magnetic domain.

The above described objects are attained by the following configurations.

According to an aspect of the present invention, there is provided an information recording method for a domain wall mobile type magneto-optical medium, wherein a light beam scans the medium to heat the medium and at the same time a magnetic field modulated in accordance wit information is applied to a heated point, and a recording magnetic domain having an arc-shaped magnetic domain wall bending convex in a forward direction of an operation of the light beam is formed so that the information is recorded.

According to another aspect of the present invention, there is provided an information recording apparatus comprising an optical head that radiates the light beam for executing the information recording method, a magnetic head that generates a magnetic field modulated in accordance with information, and means for causing the optical head, the magnetic head and the medium to relatively move.

According to a still another aspect of the present invention, there is provided a method for reproducing a recording magnetic domain fanned on a medium by the information recording method by scanning a light beam in a direction along a magnetic domain wail which is bent in a convex state.

Accordingly to further aspect of the present invention, there is provided an information reproducing apparatus comprising an optical head that radiate a light beam and means for causing the optical head and a medium to relatively move in order to execute the reproducing method.

Similar reference characters are used in the FIGURES to denote similar parts for the sake of clarity.

DETAILED DESCRIPTION OF THE PREFERRED EMBODIMENTS

A method of recording information signals to a magnetic recording medium with a thermo-magnetic recording method according to the present invention will be described as follows.

Figure 5A:
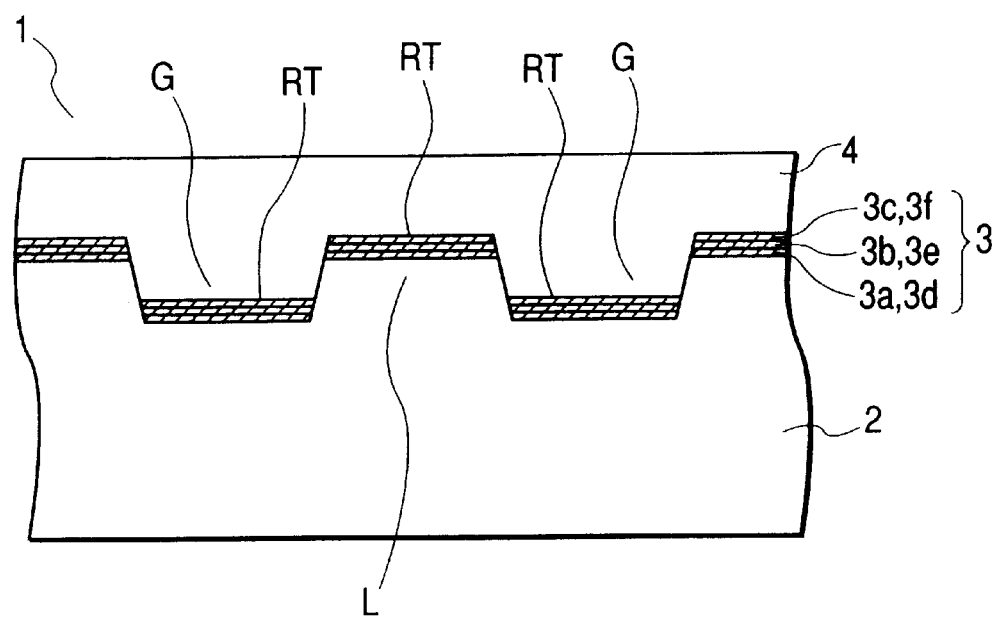
FIGS. 5A and 5B respectively illustrate in cross-section and plan views an example of configuration of the magnetic recording medium to be used for the recording method of the present invention.
Figure 5B:
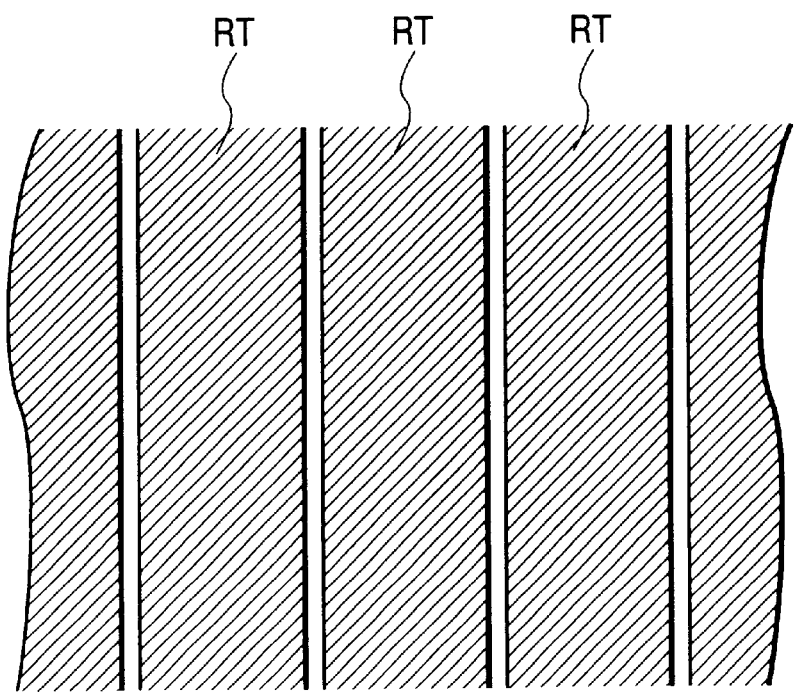

FIGS. 5A and 5B are partially enlarged views showing an example of a configuration of a magnetic recording medium to be used in a recording method of the present invention, where FIG. 5A is a longitudinal section, and FIG. 5B is a plan view. Here, a magneto-optical medium 1 is configured by a transparent resin material, such as polycarbonate, and is formed by injection forming, etc.

In a substrate 2, grooves G and lands L, which are belt-shaped and have the same width, exist in parallel alternately, and on the substrate 2, magnetic layers 3 configured by perpendicular magnetic anisotropy substance and a protection coat 4 configured by ultraviolet hardened resin.

The magnetic layer 3, formed on the grooves G and the lands L both, configures belt-shaped recording tracks RT on which information signals are recorded. The magnetic layer 3 is configured by laminating three layers made of perpendicular magnetic anisotropy substance, rare earth material, such as, for example, Tb, Gd and Dy, and transition metal material, such as Fe and Co, that is, displacement layers $3a$, switching layers $3b$, and memory layers $3c$.

Here, the displacement layers $3a$ are perpendicular magnetic anisotropy films having smaller magnetic domain wall coercivity and larger degree of displacement of domain wall than memory layers $3c$, the switching layers $3b$ are perpendicular magnetic anisotropy substance films having Curie temperature lower than the displacement layers $3a$ and the memory layers $3c$, and the memory layers $3c$ are perpendicular magnetic anisotropy films.

These three magnetic layers are formed into film by an anisotropy sputtering method so that the magnetic layers are not formed into film on side walls of the grooves G, but are formed only on the bottom surfaces of the grooves G and the upper surfaces of the lands L.

Thus, side walls of the grooves G in which no magnetic layers exist separate specially as well magnetically each recording track RT from its] adjacent recording tracks RT.

Moreover, configuring material forte substrate 2, coating both side faces of each recording track RT, and the protection coat 4 have thermal conductivity smaller than that of the substance configuring the magnetic layers 3.

As described above, thermal conductivity of the protection coat 4 as well as the substrate 2 is desirably not less than 5 percent of thermal conductivity of the perpendicular magnetic anisotropy substance. Moreover, a percentage not more than three portent would be still further preferable. Thus, no members having thermal conductivity not less than thermal conductivity of the substance configuring the magnetic layers 3 are brought into connection with the side faces of the recording tacks RT; rather both side faces of the recording tracks RT are configured only by members having thermal conductivity less than the thermal conductivity of the substance configuring the magnetic layers 3, so that the recording tracks RT are structured to restrain heat being spilt out from the side faces of the recording tracks RT rather than from its extending direction.

Incidentally, as the protection coat 4, ultraviolet hardened resin, and adhesive sheet, etc., are used.

Figure 6A:
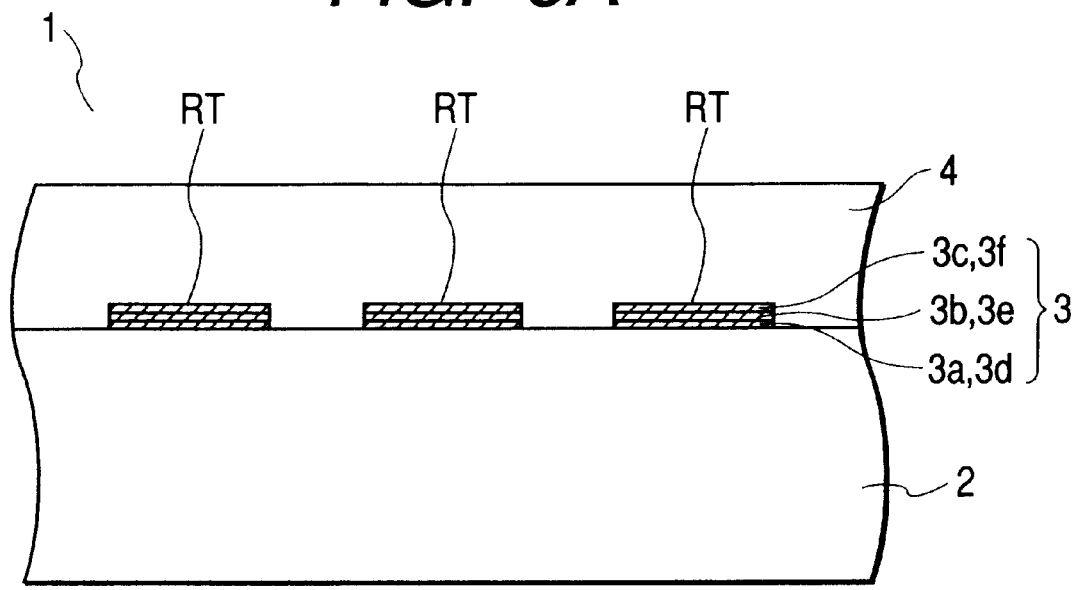
FIGS. 6A and 6B respectively illustrate in cross-section and plan views another example of a configuration of the magnetic recording medium to be used for the recording method of the present invention.
Figure 6B:
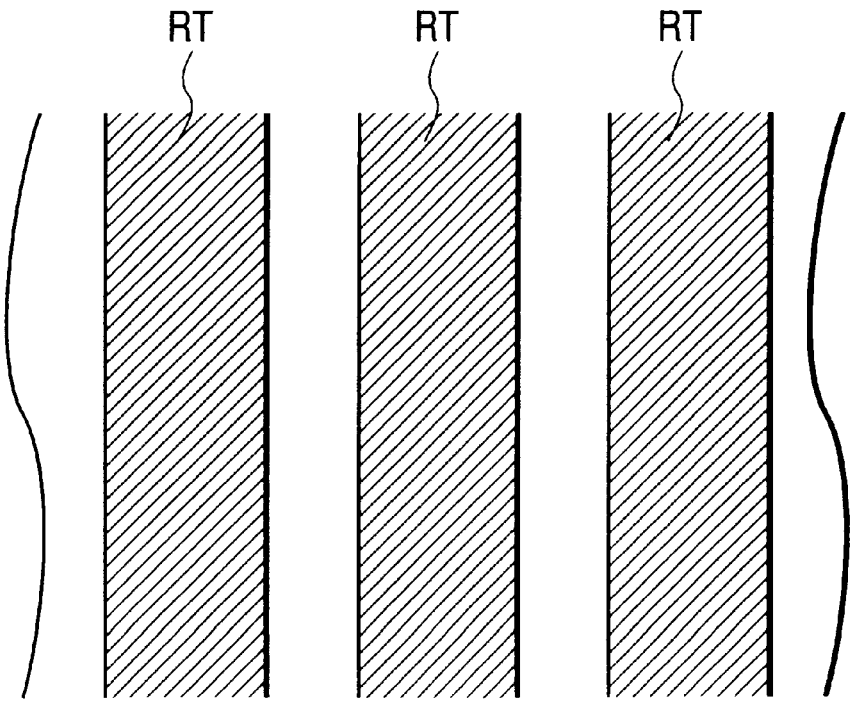

FIGS. 6A and 6B are partially enlarged views showing another configuration of a magneto-optical medium to be used in a recording method of the present invention, where FIG. 6A is a longitudinal section, and FIG. 6B is a plan view.

Here, a magneto-optical medium 1 is configured by a substrate 2 made of a transparent resin material such as polycarbonate, magnetic layers 3 that are formed on the substrate 2 and are made of perpendicular magnetic anisotropy substance and a protection coat 4 made of ultraviolet hardened resin. The magnetic layers 3 are belt-shaped in parallel, and respectively configure recording tracks RT. The magnetic layer 3 is configured by laminating three layers made of perpendicular magnetic anisotropy substance as in the above-described example, that is, displacement layers 3a, switching layers 3b, and memory layers 3c. Here adjacent recording tracks PT an formed by subjecting predetermined positions in the magnetic layers formed into a film over the entire substrate to dry etching for removal. Thus, recording tracks RT are spacially and magnetically separated from the regions on the faces of both sides thereof.

Morever, the configuring material for the protection coat 4 coating both side faces of the recording tracks RT has a thermal conductivity smaller than that of the substance configuring the magnetic layers, that is, the perpendicular magnetic anisotropy substance configuring the magnetic layers 3. Thus, no member having a thermal conductivity not less than the thermal conductivity of the substance configuring the magnetic layers 3 is brought into connection with the side faces of the recording tracks RT; rather, both side faces of each recording track RT are configured only by members a thermal conductivity less than the thermal conductivity of the magnetic layers 3, so that the recording tracks RT are structured to restrain heat being spilt out from the side faces of the recording tracks RT rather than from its extending direction.

In the present embodiment, since both side faces of the recording tracks RT are coated only the protection coat 4, thermal conductivity of the substrate 2 is not necessarily required to be made small.

Figure 7A:
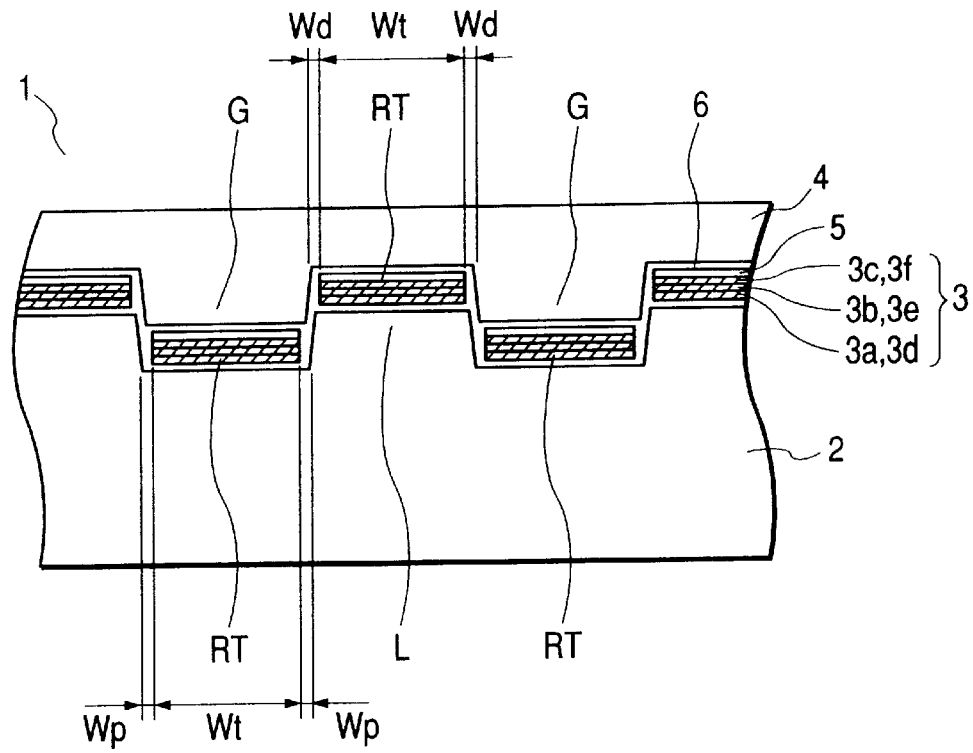
FIGS. 7A and 7B respectively illustrate in cross-section and plan views another example of a configuration of the magnetic recording medium to be used for the recording method of the present invention.
Figure 7B:
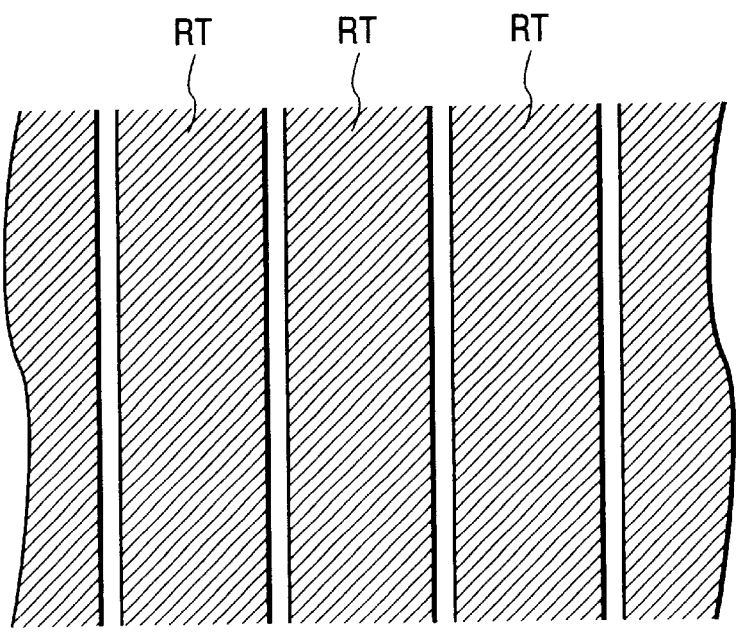

FIGS. 7A and 7B are partially enlarged views showing another configuration of a magneto-optical medium to be used in a recording method of the present invention, where FIG. 7A is a longitudinal section, and FIG. 7B is a plan view.

Here, for a magneto-optical medium 1 a transparent resin material, such as polycarbonate, is used as a substrate material, and grooves C and land L, which are belt-shaped and have the same width, are formed in parallel alternately.

On the substrate 2, the magnetic layers 3 form recording tracks. Front surfaces of the magnetic layers 3 are covered by a thermal conduction layer 5 made of Al, Au, and Ag, which have a thermal conductivity larger than that of the magnetic layers 3 or an alloy containing them, etc., so as to hasten heat proliferation on the surfaces of the recording tracks.

The rear surfaces as well as both side surfaces of the magnetic layers 3 are covered by a dielectric layer 6, made of non-polarized inorganic materials, such as SiN, $Si_3N_4$, $SiO_2$, and ZnS. This dielectric layer 6 coats intervals between recording tracks. Moreover, the entire surfaces of the dielectric layer 6 are coated with the protection coat 4.

In the present example, recording tracks RT are formed both on the lands L and the grooves G. As in the above-described example, the magnetic layers 3 are configured by three layers made of perpendicular magnetic anisotropy substance. Here, the three magnetic layers, which are formed into film by an anisotropy sputtering method, are not formed on side walls of the grooves G, but are formed only on the bottom surfaces of the grooves G and the upper surfaces of the lands L. Thereby, each recording track RT is separated spacially as well as magnetically from adjacent recording tracks.

In addition, the dielectric layers 6 are formed around the recording tracks RT in order to prevent the magnetic layers 3 configuring the recording tracks RT from undergoing corrosion, and are formed into film by isotropy sputtering method before and after forming of the magnetic layers 3 so that all surfaces (both side faces, front surfaces and rear surfaces) of the recording racks RT are coated. The configuring material of the dielectric layer 6 preferably has a thermal conductivity smaller than that for the substance configuring the magnetic layers, but in order to prioritize performance to protect the magnetic layers 3 and the optical features, it is not necessarily required to be so small as that of the protection coat 4 or the substrate 2. In its place, bays (thickness) given rise to by the dielectric layer 6 cover the recording tracks RT at both side faces of the recording tracks RT) Wd of the dielectric layer are preferably made sufficiently small compared with the width Wt of he recording tracks RT. A desirable value of this thickness Wd is, as described above, not more than 0.25 for Wd/Wt. In addition, in order to sufficiently protect the magnetic layers 3, an arrangement that yields Wd≥10 nm is desirable.

Next, a magneto-optical apparatus to thermo-magnetic record information signals into the magneto-optical medium 1 having been shown in FIGS. 5A and 5B, FIGS. 6A and 6B, or FIGS. 7A and 7B will be described.

Figure 12:
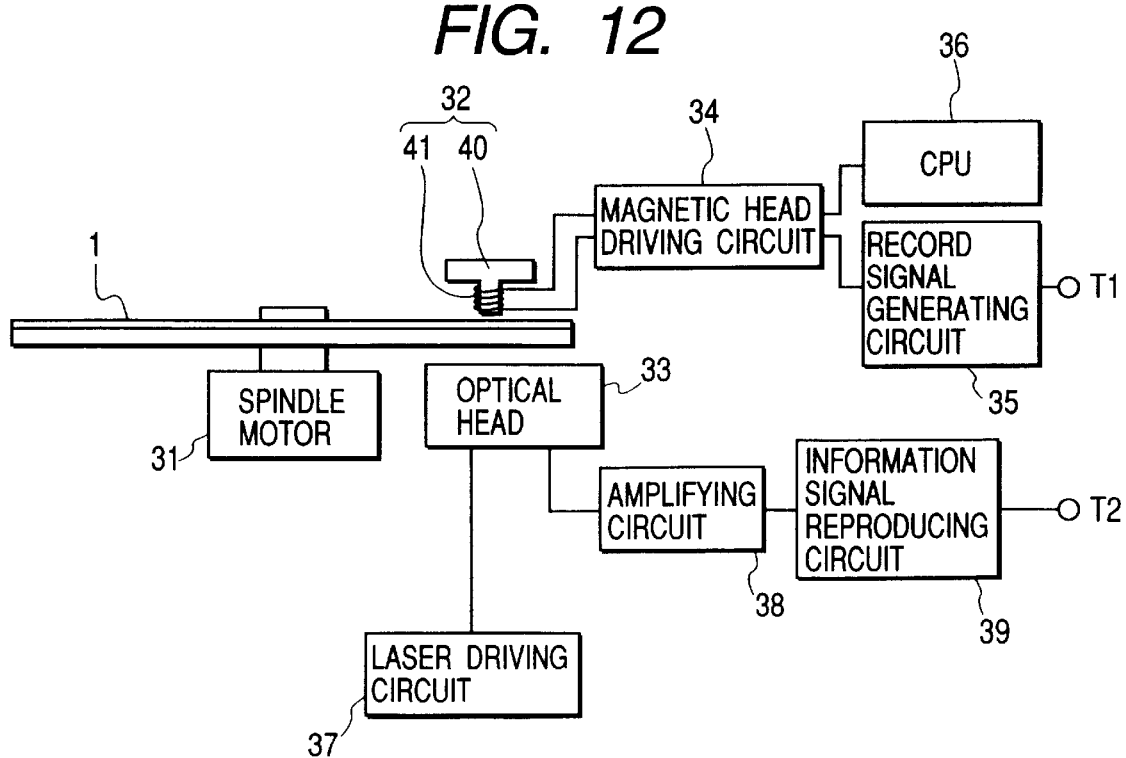
FIG. 12 is a block diagram showing a configuration of a recording apparatus of the present invention.

A schematic configuration of the recording apparatus is shown in FIG. 12. Here, a reference numeral 1 denotes a magneto-optical medium (for example, a magneto-optical disk) in which information signals are recorded and which is mounted onto a spindle motor 31 being its driving means. A magnetic head 32 is disposed on the upper surface side of the magneto-optical medium 1, and in addition, an optical head 33 to radiate recording light beams or reproducing light beams into the magneto-optical medium is disposed in the manner of being opposite against the magnetic head 32.

The magnetic head 32 is configured by a core 40 made of a soil magnetic material and a magnetic field generating coil 41 which is caused to wind the periphery of the core 40. A magnetic head driving circuit 34 is brought into connection with the magnetic field generating coil 41 of the magnetic head 32 and a record signal generating circuit 35 to implement processing, such as coding, on information signals input from an input terminal T1 for transmitting into the magnetic head driving circuit 34 and a CPU (Central Processing Unit) 36 controlling the magnetic head driving circuit 34. The magnetic head driving circuit 34 provides the magnetic field generation coil 41 of the magnetic head 32 with electric current that can switch the direction and intensity in accordance with information signals so that the magnetic head 32 generates a magnetic field that can be switched in terms of direction signals and perpendicularly applies it to the magneto-optical medium 1.

The optical head 33 is configured by a laser beam source, an optical sensor, an optical system, etc. (not individually shown). A laser driving circuit 37 is brought into connection with the laser beam source and an amplifying circuit 38 and an information signal reproducing circuit 39 are connected with the optical sensor so as to configure a reproduction signal processing system.

Figure 1A:
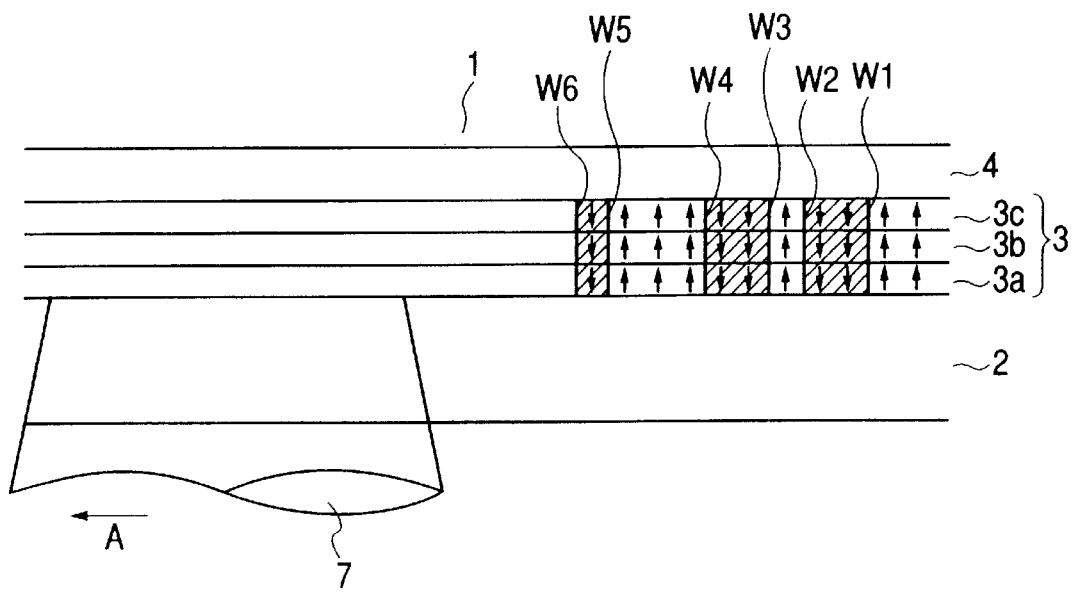
FIGS. 1A and 1B respectively illustrate in cross-section and plan views of a recording method of the present invention.
Figure 1B:
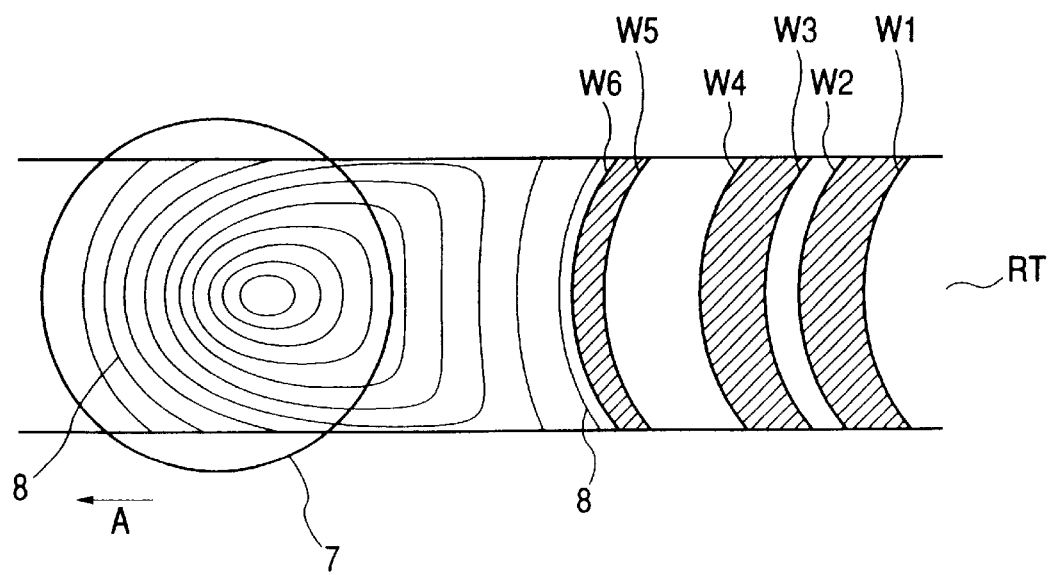

FIGS. 1A and 1B are partially enlarged views of the magneto-optical medium 1, showing a recording method of information signals, where FIG. 1A is a cross-sectional view, and FIG. 1B is a plan view as viewed from the direction of a lower surface. At the time when information signals are recorded, the optical head 33 implements radiation by concentrating a highly powered recording light beam 7 to recording tracks RT through a substrate 2. At the same time, a spindle motor 31 drives the magneto-optical medium 1, and thereby the recording light beam 7 scans the recording tracks RT in the direction indicated by an arrow A. A temperature of magnetic layers 3 increases with radiation of the recording light beam 7, and in the periphery of the radiation region of the recording light beam 7 a thermal distribution shown by an isothermal line in the drawing is formed. Here, a reference numeral 8 denotes an isothermal line of a temperature Tc approximately equal to the curie temperature of the memory layer 3c.

Here, in the trailing direction of the radiation region of the recording light beam 7 in particular, that is, in the region where the recording light beam 7 has already past, conductive proliferation of heat accumulated mainly while the recording light beam 7 radiates will become a main cause to determine temperature distribution. In the present invention, the recording tracks RT are structured to restrain heat release from the side surfaces thereof, and therefore in the trailing direction of the recording light beam 7, heat quantity being piled up gets larger in the position closer to the side surfaces rater than in the center of the recording tracks RT. As a result thereof, the trailing portion of the isothermal line 8 will become shaped as shown in FIGS. 1A and 1B, approximately linear in the direction perpendicular to the direction of scanning (arrow A) of the recording light beam 7 or as an arc which is bent convex forward in the direction of scanning (arrow A) of the recording light beam 7.

Figure 8A:
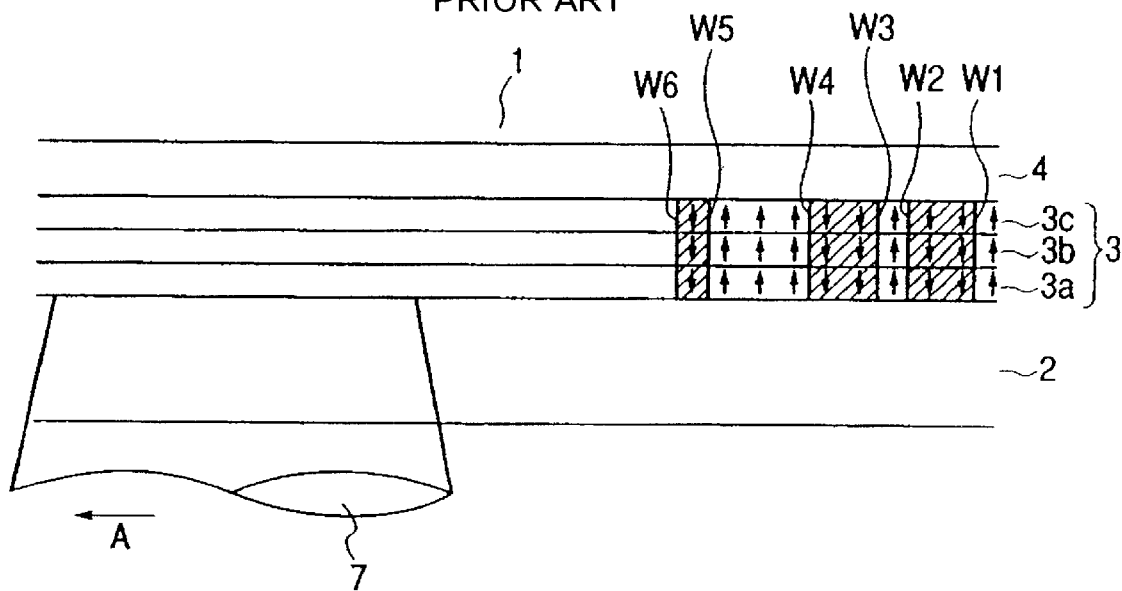
FIGS. 8A and 8B respectively illustrate in cross-section and plan views a conventional recording method of information signals.
Figure 8B:
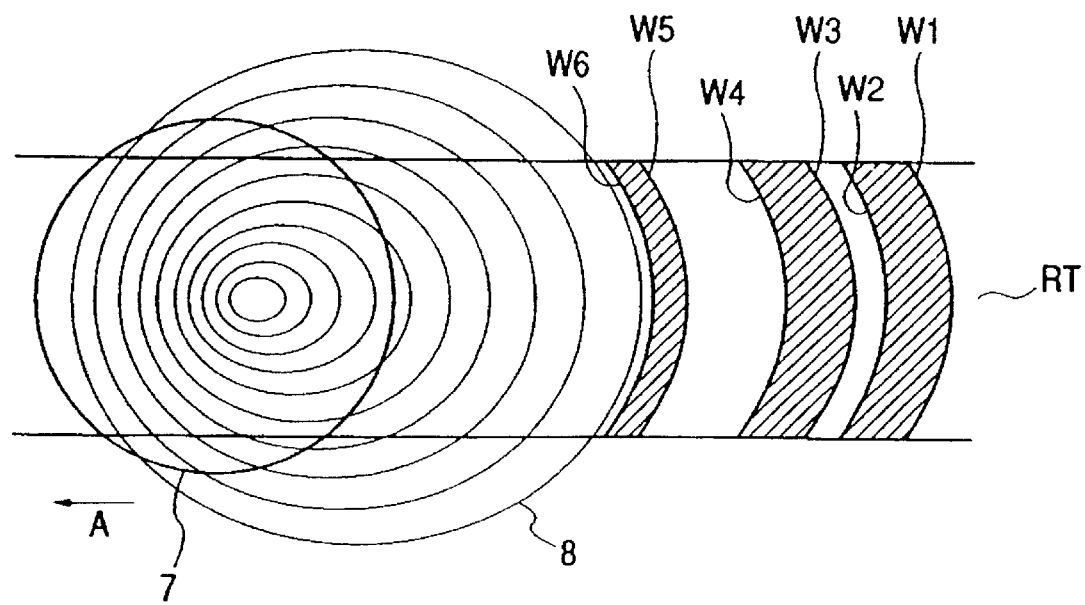

On the other hand, in a conventional art, since magnetic layers with weakened magnetism remain in the gaps between the recording tracks, heat supplied by the concentrated light beam is released also from the side surfaces of the recording tracks RT, and thus the isothermal line 8 will be shaped approximately oval, thereby extending in the trailing direction of the recording light beam 7 (FIG. 8B).

Thus, the optical head radiates the recording light beam 7 and at the same time, the magnetic head 32 applies onto the radiation region of the recording light beam 7 a perpendicular magnetic field that varies its direction up and down in accordance with information signals. The memory layer 3c loses magnetization when it passes the front portion of the isothermal line 8, resulting in its temperature being not less than the curie temperature Tc, which gives rise to magnetization in the same direction as the magnetic field applied at that time when it passes the back portion of the isothermal line 8, resulting in its temperature being not more than Tc.

Moreover, as it moves in a direction remote from the back portion of the isothermal line 8, the temperature drops while coercivity increases, so that the above-described magnetization is fixed. Thus, magnetization regions having magnetization in the upward direction and in the downward direction corresponding with the direction of the applied magnetic field are arranged alternately so as to be fanned on the recording track RT, as shown by arrows in the upward and downward direction in FIG. 1A, and in the boundary portion between the magnetization region and the preceding and following magnetization region, magnetic domain walls W1, W2, W3, W4, W5, and W6 are formed. These magnetic walls, which are formed along the back portion of the isothermal line 8, will be shaped approximately linear in the direction perpendicular to the direction of scanning (arrow A) of the recording light beam 7 or as an arc which is bent convex in the same direction as the direction of scanning. In addition, the displacement layer 3a, the switching layer 3b, and the memory layer 3c are mutually brought into exchange coupling so that magnetization and the magnetic domain walls W1, W2, W3. W4, W5 and W6 are transfer formed onto the displacement layer 3a and the switching layer 3b as well.

Next, a method to reproduce information signals from the magneto-optical medium 1 in which information signals are recorded with a reproducing apparatus by magnetic domain wall displacement reproducing system will be described. The reproducing apparatus is shown in FIG. 12. In FIG. 12, detection signals detected by the optical head are amplified by the amplifying circuit 38, and an information signal reproducing circuit 39 reproduces information signals from the amplified detection signals, for output from the output terminal T2.

Figure 2A:
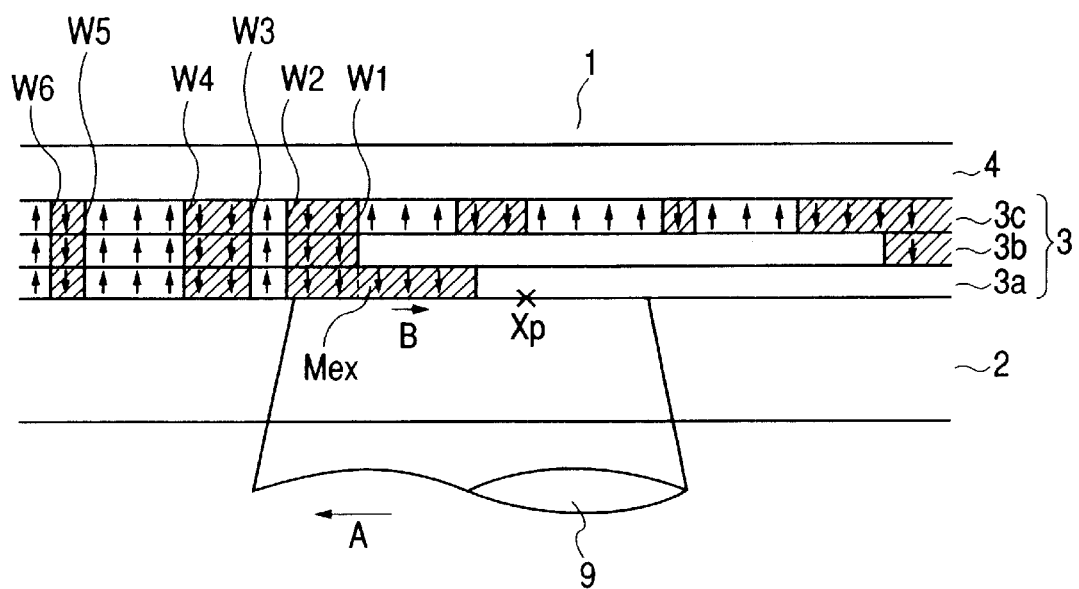
FIGS. 2A and 2B respectively illustrate in cross-section and plan views a method of reproducing information signals with the magnetic domain wall mobile reproducing system from a magnetic recording medium in which the information signals are recorded with the recording method of the present invention.
Figure 2B:
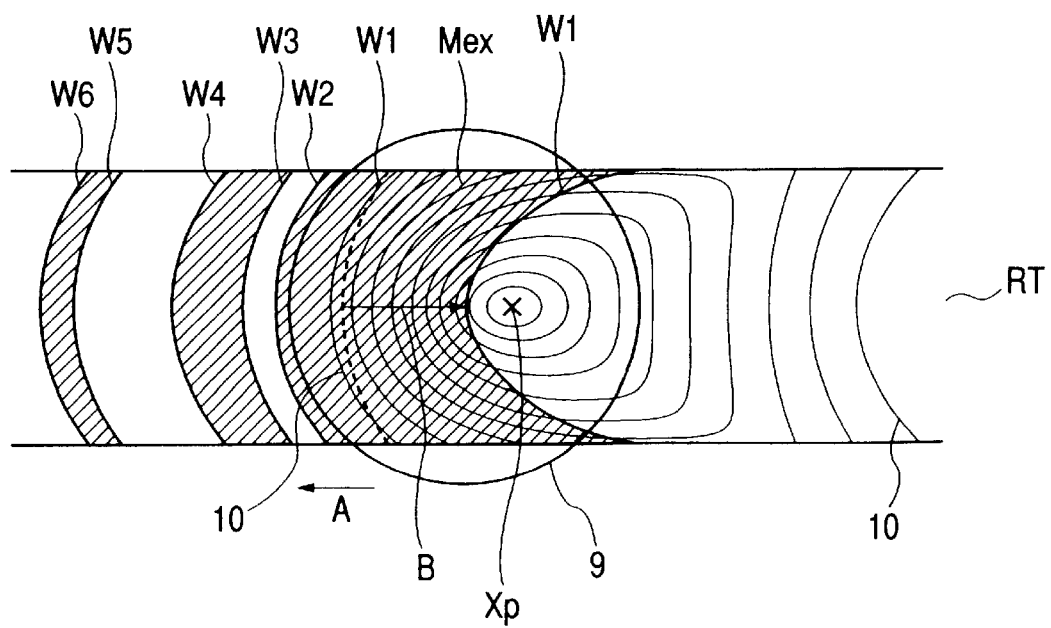

FIGS. 2A and 2B are partially enlarged views of the magneto-optical medium 1 showing a reproducing method of information signals by way of magnetic domain wall displacement reproducing system, where FIG. 2A is a cross-sectional view, and FIG. 2B is a plan view as viewed from the direction of a lower surface. At the time when information signals are reproduced, the optical head 33 implements radiation by concentrating a low powered reproducing light beam 9 to a recording track RT through a substrate 2. At the same time, the spindle motor 31 drives the magneto-optical medium 1, and thereby the reproducing light beam 9 scans the recording track RT in the direction indicated by an arrow A. A temperature of a magnetic layer 3 increases with radiation of the reproducing light beam 9, and in the periphery of the radiation region of the reproducing light beam 9 a thermal distribution, shown by an isothermal line in the drawing, is formed. Here, reference numeral 10 denotes an isothermal line of a temperature Ts approximately equal to the curie temperature of the switching layer 3b, and reference character Xp denotes a peak position of temperature. As described later, in the displacement layer 3a of the recording rack Rt, the magnetic domain wall is movable only in a region of temperature not less than Tx, that is, a region surrounded by the isothermal line 10; movement in other regions is impossible.

Figure 9A:
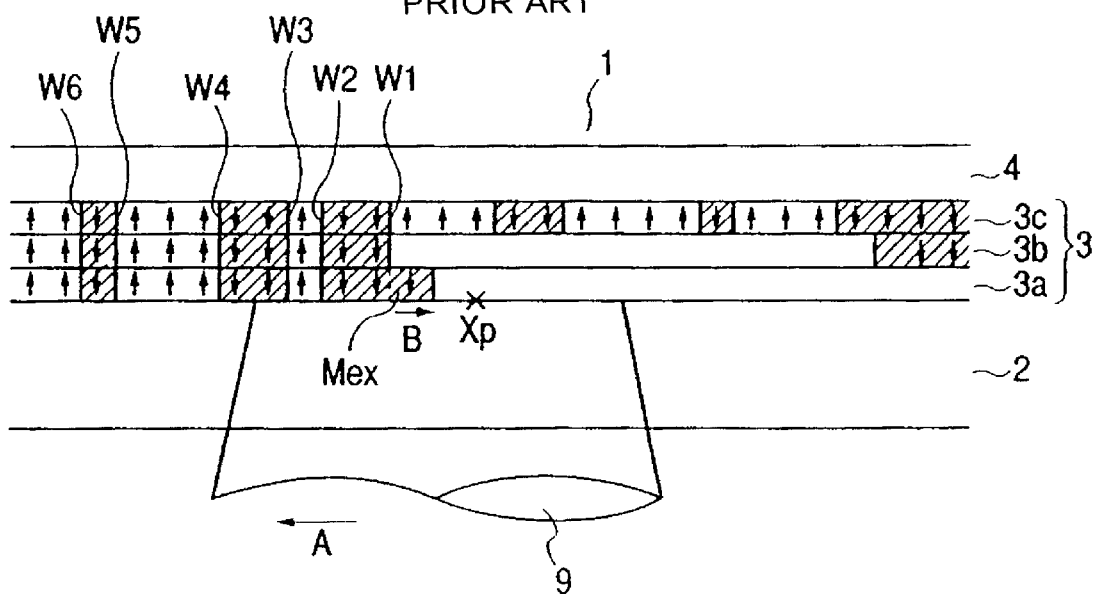
FIGS. 9A and 9B respectively illustrate in cross-section and plan views a method to reproduce information signals with the magnetic domain wall mobile reproducing system from the magnetic recording medium in which the information signals are recorded with a conventional recording method.
Figure 9B:
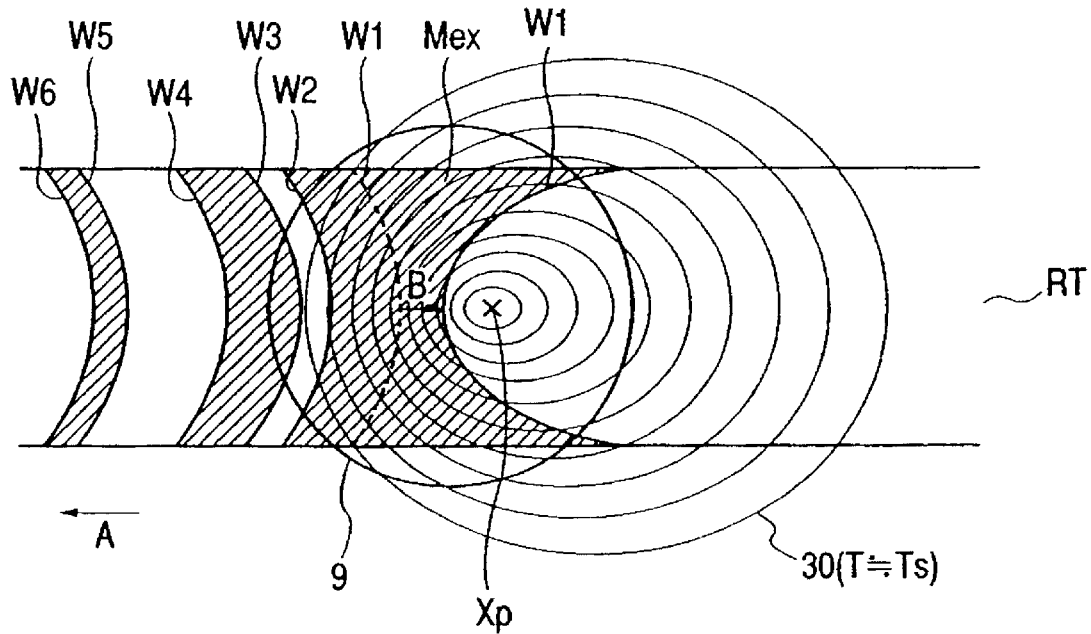

Here, in the forefront portion of the radiation region of the reproducing light beam 9, since lapse of time is still short from starting of temperature increase, influence of heat conductive proliferation to temperature distribution is small, and mainly energy distribution of the reproducing light beam 9 will become a main cause of influence the temperature distribution. Accordingly, even if the recording tracks RT are structured so that heat release from both side surfaces is restrained, the isothermal line 10 will become shaped as shown in the drawing, as an arc which is bent convex in the same direction of scanning (arrow A) of the reproducing light beam 9. That is, the direction of bending in the forefront portion of the isothermal line 10 is the same as in the conventional art shown by the reference numeral 30 in FIG. 9B. Incidentally, in the example shown in FIG. 2B, in the trailing portion of the radiation region of the reproducing light beam 9, that is, the region which comes after the reproducing light beam has already passed the radiation region, as at the time of recording, mainly conductive proliferation of heat that has been accumulated while the reproducing light beam was being radiated influences temperature distribution, and therefore the isothermal line will become shaped as an arc which is bent convex in the same direction (that is, in the opposite direction of the prior art) as the scanning direction (arrow A) of the reproducing beam of the back portion of the isothermal line 10, but this little influences reproducing performance.

Here, in a position sufficiently remote from the radiation region of the reproducing light beam 9, temperature of the magnetic layer 3 is low, and in this position, the displacement layer 3a, the switching layer 3b, and the memory layer 3c have mutually undergone exchange coupling, and magnetization as well as the magnetic domain wall formed in the memory layer 3c have been transfer-formed in the switching layer 3b and the displacement layer 3a as well. In addition, since the temperature distribution is approximately uniform, a driving power to move the magnetic domain wall transcribed into the displacement layer 3a does not act and therefore the magnetic domain wall remains fixed. However, in a location closer to the radiation region of the reproducing light beam 9, the temperature of the magnetic layer 3 increases, and is subject to passing the forefront portion of the isothermal line 10, the temperature of the switching layer 3b reaches riot less than Ts so as to cancel magnetization. Thus, since exchange coupling among the displacement layer 3a, the switching layer 3b, and the memory layer 3c is cut in the region with temperature surrounded by the isothermal line 10 higher than Ts and the displacement layer 3a and the regions of both side surfaces of the recording track RT are not brought into magnetic coupling, the magnetic domain wall will become movable without being restricted in the displacement layer 3a. Moreover, since the surrounding temperature is inclined, the driving power will act on the magnetic domain wall in the direction of higher temperature, that is, of lower energy. Thus, the magnetic domain wall (W1 in FIGS. 2A and 2B) which has passed through the forefront portion of the isothermal line 10 moves rapidly toward a position Xp whose temperature reaches the peak, as shown by arrow B in the displacement layer 3a. Incidentally, in the drawing, the magnetic domain wall W1 prior to movement is indicated by a broken line. Accompanied by movements of this magnetic domain wall, a magnetization region Ma having magnetization in one direction (the downward direction in the drawn example) is extended and formed Incidentally, the memory layer 3c is configured by a material having a small degree of displacement of domain wall mobility, and therefore the magnetic domain wall does not move in the memory layer 3c.

Thus, the magnetic domain walls W1, W2 . . . , W6 sequentially move toward the position Xp at the time when they pass the forefront portion of the isothermal line 10, and each time the magnetization region Mex, which has magnetization upward and downward and extended, is formed alternately. A polarization direction of the reflecting light of the reproduction light beam 9 from this magnetization region Ma is rotated in accordance with the direction of magnetization of the magnetization region Mex due to magneto-optics effect (Kerr effect). Rotation of such polarization direction is detected using an optical head. Since the detected signals include changes in signals corresponding to movement of the magnetic domain wall, with the magnetic domain wall as an information signal domain being formed at a position corresponding with the information signals to be stored, information signals can be reproduced based on the timing of changes in the signals.

Here, since the directions of the recording light beam and the direction of the reproduction light beam scanning the recording tracks are normally the same, as shown in FIGS. 1A and 1B and FIGS. 2A and 2B, the shape of the magnetic domain wall so formed is at least not convex toward the opposite direction of the scanning direction (arrow A) of the recording light beam 7, but will be linear, or coincide with the direction of the bending in the forefront portion of the isothermal line 10 formed by the reproducing light beam 9. Thus, the entire magnetic domain wall passes the forefront portion of the isothermal line 10 formed by the reproducing light beam 9 approximately at the same time, and the driving power acts approximately evenly over the entire portion, reducing variation of the point of time when the magnetic domain wall starts moving. As a result thereof, jitter of detected signals decreases, making more exact reproduction of information signals possible.

In addition, even in the case where a forming interval of the magnetic domain wall has been made short, a portion of the subsequent magnetic wall will never pass the forefront portion of the isothermal line 10 before the entire magnetic domain wall of the subject domain wall has passed the forefront portion of the isothermal line 10. As a result thereof, detection resolution capability is improved.

(Practical embodiment 1)

A magneto-optical medium with the most simple configuration corresponding with FIGS. 5A and 5B was produced.

As a substrate for magneto-optical medium, a disk made of polycarbonate with thickness of 1.2 mm was used. Incidentally, thermal conductivity K2 of the substrate material is $0.2 J \cdot m^{-1} \cdot s^{-1} \cdot K^{-1}$.

At first, by injection forming method, lands L and grooves G are formed in this disk. The width of the lands L (excluding the inclined face portions) is 0.6 $\mu$m, and the width of the grooves G (excluding the inclined face portions) is 0.6 $\mu$m. In addition, the depth of the grooves G is 0.18 $\mu$m. Moreover, the side wall inclined portion of the groove G has a width of 0.11 $\mu$m when viewed from above the disk.

Next, in the doughnut-shaped region in which the land L and the groove G are formed in this disk, a magnetic layer 3 is fanned. The magnetic layer 3 comprises a displacement layer 3a having perpendicular magnetic anisotropy, a switching layer 3b, and a memory layer 3c. The magnetic layer 3 is never released to atmosphere, and is formed into a film by sputtering filming of continuous anisotropy. These magnetic layers are not fanned on the side walls of the grooves G, but are formed only on the upper surface of the lands L and the bottom surfaces of the grooves G, and thereby form recording tracks RT, respectively.

The composition of the displacement layer 3a is GdFeCo, and the film thickness thereof is 30 nm. The composition of the switching layer 3b is TbFe, and the film thickness thereof is 10 nm. The composition of the memory layer 3c is TbFeCo, and the film thickness thereof is 80 nm.

The thermal conductivity K1 of this entire magnetic layer 3 subject to assessment by another experiment is $12 J \cdot m^{-1} \cdot s^{-1} \cdot K^{-1}$ and satisfies K2/K1<0.05.

Lastly, a protection coat 4 for protecting the magnetic layer against mechanical impact as well as corrosion is formed as a film to coat at least side surfaces of the recording tracks. As the protection coat, an ultraviolet hardened resin of acrylic system is used. Its thermal conductivity K2 is approximately equal to that of the substrate and is 0.2J·m$^{-1}$·s$^{-1}$·K$^{-1}$.

When reproduction characteristic test of this magneto-optical medium was implemented, jitter decreased by approximately 15 percent from a comparative example to be described later, enabling memory density to be improved in exchange.

(Practical embodiment 2)

The present practical embodiment corresponds with FIGS. 6A and 6B. As shown in FIGS. 6A and 6B, a magneto-optical medium substrate 2 of the present practical embodiment is featured by its front surface being flat.

Next, a magnetic film 3 as in the practical embodiment 1 was formed into doughnut-shaped film by isotropy sputtering onto the sites where recording tracks of this substrate are formed.

Subsequently, the magnetic films 3 between the recording backs RT were removed by means of photolithography method and dy etching, and the recording tracks RT were produced into belts.

At this time, the width Wt of the recording track is 0.6 µm, and the width of the gap between the recording tracks is 0.25 µm.

Lastly, as in the present practical embodiment 1, a protection coat 4 was applied to the front surface of the magneto-optical medium to obtain the magneto-optical medium of the present invention.

When reproduction characteristic test of this magneto-optical medium was implemented, jitter improvement effect equivalent to that in the practical embodiment 1 could be continued.

(Practical embodiment 3)

The present practical embodiment corresponds with FIGS. 7A and 7B.

As a substrate 2 of a magneto-optical medium, the same one as in the practical embodiment 1 was used, and by injection forming method, lands L and grooves G were formed.

At this time, the width of the lands L (excluding the inclined face portions) is 0.6 µm, and the width of the grooves C (excluding the inclined face portions) is 0.6 µm. In addition, the depth of the grooves G is 0.18 µm. Moreover, the side wall inclined portion of the groove G has a width of 0.11 µm when viewed from above the disk.

Subsequently, a dielectric layer of SiN was formed into a film with a thickness of 80 nm over the entire substrate 2, inclusive of the side walls of the grooves, by isotropy sputtering method.

Subsequently, the magnetic layers 3 were formed into a film, with a configuration similar to that in the practical embodiment 1, onto the upper surface of the lands L and the bottom surfaces of the grooves G by anisotropy sputtering method.

Subsequently, also over the entire predetermined region in which gaps between the recording tracks and the recording tracks are formed, an AlTi film 5, to become a thermal conductive film on the recording tracks in the later stops, was Conned into a film with a thickness of 40 nm by anisotropy sputtering method. Incidentally, the thermal conductivity of the thermal conductive film is 80J·m$^{-1}$·s$^{-1}$K$^{-1}$ and is 6.7 times that of the magnetic film. Lastly, a dielectric film of SiN with a thickness of 40 nm was formed over the entire substrate again by isotropy sputtering meted, so that the upper surfaces and side surfaces of the recording tracks RT configured by the magnetic layers 3 were all protected. Incidentally, the thermal conductivity K3 of the dielectric layer is 1.5J·m$^{-1}$·s$^{-1}$·K$^{-1}$ and a value smaller than that oft, magnetic layer.

Lastly, as in the practical embodiment 1, a protection coat 4 was applied to obtain a magneto-optical medium of the present practical embodiment.

The magneto-optical medium of the present practical embodiment has a recording track width Wt of 0.6 µm, and a bay Wd of the dielectric layer of 0.08 µm, satisfying the condition Wd/Wt<0.25.

When reproduction characteristic test of this magneto-optical medium was implemented, compared with a comparative example to be described later, it was confirmed that jitter decreased by approximately 17 percent enabling memory density to be improved in exchange. Moreover, the magneto-optical medium was left under an environment of temperature 50° C. and moisture of 80 percent for 1000-hour, giving rise to no change in this feature, and was confirmed to have sufficient endurance.

(Comparative example 1)

Figure 10A:
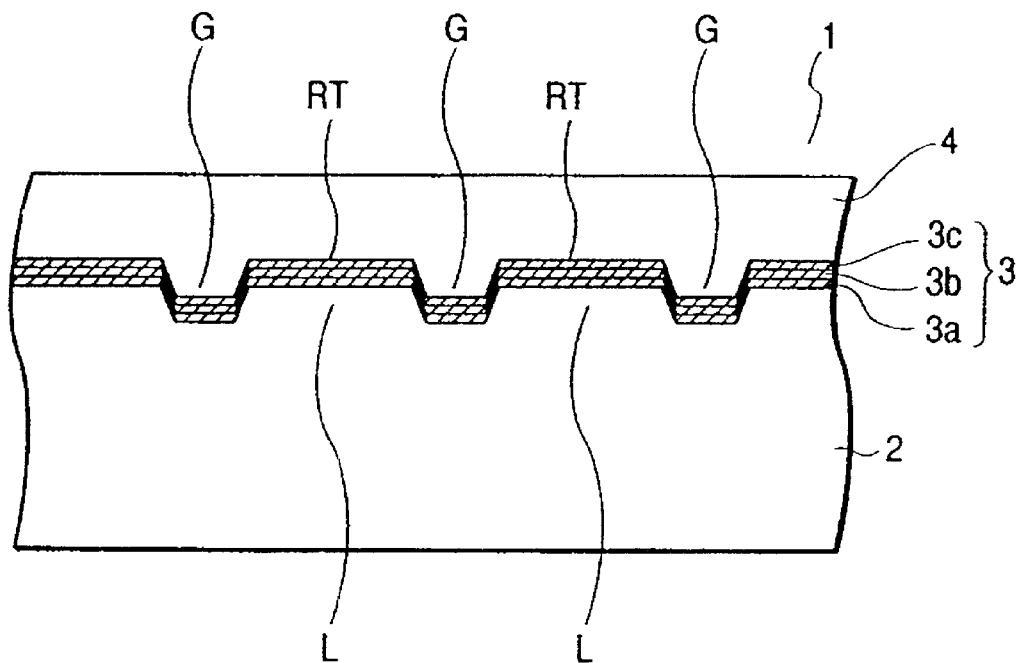
FIGS. 10A and 10B respectively illustrate in cross-section and plan views a configuration of a conventional magnetic recording medium.
Figure 10B:
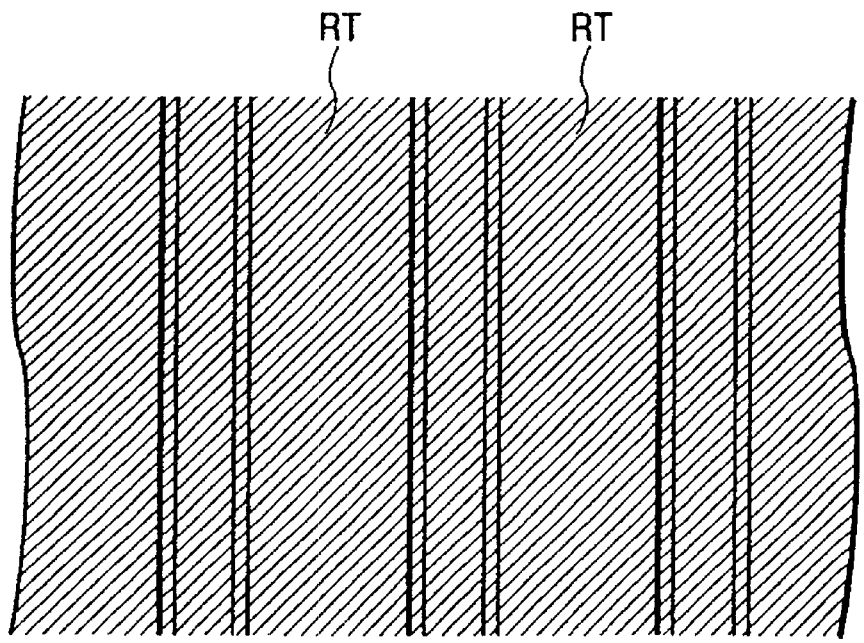
Figure 11:
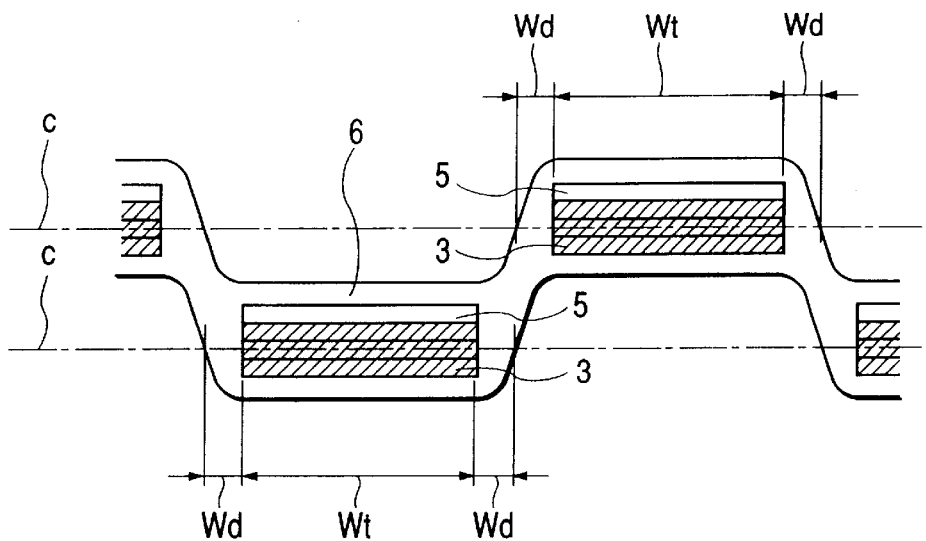
FIG. 11 is a partially enlarged view of the configuration in FIG. 7A to be used in a recording method of the present invention.

A magneto-optical medium of a conventional method shown in FIGS. 10A and 10B was produced.

As a substrate of a magneto-optical medium, the same one as in the practical embodiment 1 was used.

At first, by injection forming method, lands L and grooves G were formed in this disk. The width of the lands L (excluding the inclined face portions) is 0.6 µm, and the width of the grooves G (excluding the inclined face portions) is 0.2 µm. In addition, a balance between the heights of the lands L and of the grooves G is 0.08 µm. Moreover, the side portion between a land L and a groove G has a width of 0.15 µm, when viewed from above the disk.

Next, as in the practical embodiment 1, in the doughnut-shaped region in which the land L and the groove G are formed in this disk, a magnetic layer 3 is formed.

After film-formation of the magnetic layer 3 was over, along the grooves G, a light beam for thermal processing having energy higher than the intensity of the rewritable reproducing concentrated light beam was brought into scanning. Since this will change the composition and structure of the magnetic layer 3 in the grooves G, magnetism of the magnetic layer 3 in the grooves G decreases so as to enable the recording tracks to be magnetically separated.

Lastly, a protection coat 4, as that in the practical embodiment 1, was fonned as a film so as to coat the side surfaces of the recording tracks.

(Practical embodiment 4)

The above-described practical embodiment was described by taking as an example the case where thermal magnetic recording method is the present invention, the magneto-optical medium in which information signals have been recorded is reproduced by the magnetic domain wall mobile reproduction system, but application of the present invention should not be limited hereto. As follows, an example of a case where with thermal magnetic recording method is being the present invention, a magneto-optical medium in which information signals have been recorded is reproduced by a super resolution reproduction system will be described. Incidentally, details on the perpendicular magnetic anisotropy substance configuring the magnetic layer 3 and the reproducing principle, which are described for example in Japanese Patent Application Laid-Open No. 7-334877, which is an application of the present applicant, will be limited to schematic description here, and the description will be focused on an effect obtainable by combination of the thermal magnetic recording system being the present invention.

Also in the present practical embodiment, the configuration of the magneto-optical medium 1 being a magnetic memory medium is the same as in FIGS. 5A and 5B, a magneto-optical medium 1 is configured by a substrate 2 made of a transparent resin material such as polycarbonate, etc., in which belt shaped grooves G and lands L with approxinlately the same width are fonned alternately, in parallel, magnetic layers 3 that are formed on the substrate 2 and are made of perpendicular magnetic anisotropy substance, and a protection coat 4 made of ultraviolet hardened resin. The magnetic layers 3 formed on the bottom surface of the grooves G, and the magnetic layers 3 formed on the lands L both configure belt-shaped recording tracks RT in which information signals are recorded. The magnetic layers 3 are not formed on the side walls of the grooves G.

In addition, as shown in FIG. 6A, a magneto-optical medium 1 is configured by a substrate 2 made of a transparent resin material such as polycarbonate, etc., magnetic layers 3 that are fanned ante substrate 2 and are made of perpendicular magnetic anisotropy substance and a protection coat 4 made of ultraviolet hardened resin. The magnetic layers 3 are belt-shaped, in parallel, and respectively configure recording tracks RT in which information signals are recorded. Each adjacent recording track RT is formed at an interval.

Or as shown in FIG. 7A, a magneto optical medium 1 is configured by a substrate 2 made of a transparent resin material such as polycarbonate, etc., in which belt shaped grooves G and lands L with approximately the same width are Conned alternately, in parallel, magnetic layers 3 that are formed on the substrate 2 and are nude of perpendicular magnetic anisotropy substance, thermal conductive layers 5 which are formed on the magnetic layer 3 and are made of Al, Au and Ag or an alloy containing them, etc., dielectric layers 6 made of non-polarized inorganic materials such as SiN, $Si_3N_4$, $SiO_2$, and ZnS, etc., and a protection coat 4 made of ultraviolet hardened resin. The magnetic layers 3 formed on the bottom surface of the grooves G and the magnetic layers 3 fonned on the lands L both configure belt-shaped recording tracks RT in which information signals are recorded. The magnetic layers 3 are not formed on the side walls of the grooves G. In addition, the thermal conductive layers are formed only on the magnetic layers 3 configuring the recording tracks RT, and at least are not formed on both side surface of the recording tracks RT. The dielectric layers 6 are formed in the periphery of the recording tracks UT and both side surfaces of the recording tracks RT are covered by tightly contacted dielectric layer 6.

Thus, also in the present practical embodiment, as in the first practical embodiment, the recording tracks RT and their adjacent recording tracks RT are not connected by the magnetic layers 3. Due to this, the recording tracks RT are not brought into magnetic connection with the regions of both side surfaces.

In addition, a member having its thermal conductivity not less than the thermal conductivity of substance configuring the magnetic layer 3 is not brought into connection with both side surfaces of the recording tracks RT, and both side surfaces of the recording tracks RT are configured by a material having its thermal conductivity less than the thermal conductivity of substance configuring the magnetic layer 3. Thus, the recording tracks RT are configured to restrain heat release from the side surfaces of the recording tracks RT rather than from their extended direction.

Incidentally, in the present practical embodiment, the magnetic layer 3 is to be configured by laminating three layers made of perpendicular magnetic anisotropy substance, rare earth such as, for example, Tb, Gd and Dy, and transition metal such as Fe and Co, etc., that is, a reproducing layer 3d, an intermediate layer 3e, and a memory layer 3f. Here, the reproducing layers 3d as well as the intermediate layers 3e are inter-surface magnetic films under room temperature, and will be perpendicular magnetic anisotropy film under high temperature. In addition, the curie temperature of the intermediate layers 3e is higher than room temperature and lower than the other two layers. In addition, the memory layers M are perpendicular magnetic anisotropy films.

Figure 3A:
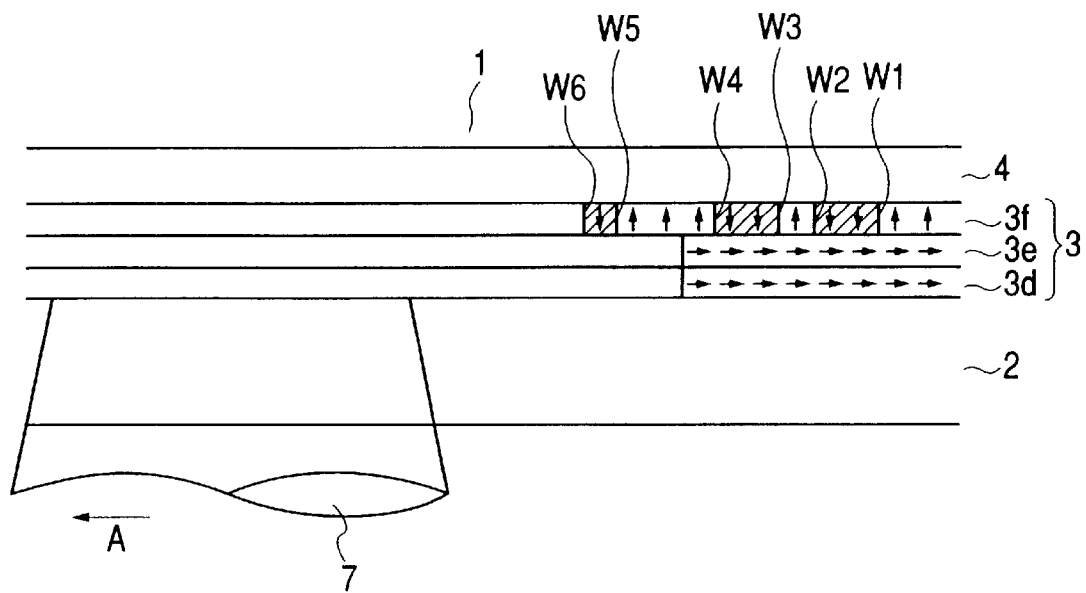
FIGS. 3A and 3B respectively illustrate in cross-section and plan views another recording method of the present invention.
Figure 3B:
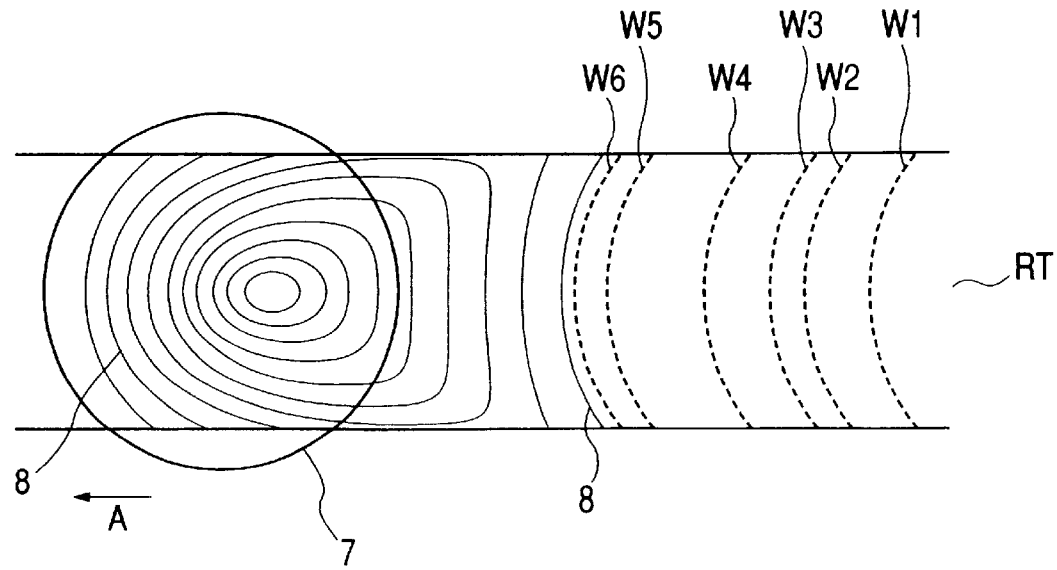

Next, a method for recording information signals into the magneto-optical medium 1 shown in FIGS. 5A and 5B, FIGS. 6A and 6B and FIGS. 7A and 7B with a recording apparatus will be described. The recording apparatus comprises driving means for an optical head, a magnetic head and magneto-optical medium 1. FIGS. 3A and 3D are partially enlarged views of the magneto optical medium 1, showing a recording method of information signals, where FIG. 3A is a cross-sectional view, and FIG. 3B is a plan view as viewed from the direction of a lower surface. At the time when information signals are recorded, the optical head implements radiation by concentrating a highly powered recording light beam 7 as being heating means to a recording track RT through a substrate 2. At the same time, the driving means drives the magneto-optical medium 1, and thereby the recording light beam 7 scans the recording track RT in the direction indicated by an arrow A. The temperature of a magnetic layer 3 increases with radiation of the recording light beam 7, and in the periphery of the radiation region of the recording light beam 7 a thermal distribution, shown by an isothermal line in the drawing, is fanned. Here, reference numeral 8 denotes an isothermal line of a temperature Tc approximately equal to the curie temperature of the memory layer 3c.

Here, in the trailing direction of the radiation region of the recording light beam 7 in particular, that is, in the region where the recording light beam 7 has already passed the radiation region, conductive proliferation of heat accumulated while the recording light beam 7 passes the radiation region mainly influences temperature distribution. In the present invention, the recording tracks RT are structured so as to restrain heat release from both side surfaces thereof, and therefore in the trailing direction of the recording light beam 7, heat quantity being piled up gets larger in the position closer to both peripheries than in the center of the recording tracks RT. As a result thereof, the trailing portion of the isothermal line S will become shaped, as shown in FIG. 3B, as an arc which is bent convex in the same direction as the direction of scanning (arrow A) of the recording light beam 7. On the other hand, in the conventional art, since heat is conducted and proliferates also to both side surfaces of the recording tracks RT, as show in FIG. 8B, the isothermal line S will be shaped approximately oval by extending in the trailing direction of the recording light beam 7. That is, In the present invention, the direction of bending of the isothermal line formed in the trailing direction of the radiation region of the recording light beam will be opposite that in the prior art.

Thus, radiation of the recording light beam 7 by way of an optical head concurs with the magnetic heads application of a perpendicular magnetic field, the direction of which varies upward and downward to the radiation region of the recording light beam 7 in accordance with information signals. The memory layer 3*f* loses magnetization when it passes the front portion of the isothermal line 8, resulting in its temperature being not less than the curie temperature Tc, and gives rise to magnetization in the same direction as the magnetic field applied at that time when it passes the back portion of the isothermal line 8, resulting in its temperature being not more than Tc. Moreover, as it moves in a direction remote from the back portion of the isothermal line 8, the temperature drops while coercivity increases so that the above-described magnetization is fixed. Thus, magnetization regions having magnetization in the upward direction and in the downward direction an accordance with the direction of the applied magnetic field are arranged alternately so as to be formed on the recording track RT, as shown by arrows in the upward and downward direction in FIG. 1A, and in the boundary portion between the magnetization regions and the preceding and following magnetization region, magnetic domain walls W1, W2, W3, W4, W5 and W6 as marks of an information signal, are formed. These magnetic domain walls, which are formed along the back portion of the isothermal line 8, will be shaped as an arc which bends convexly in the same direction as the scanning direction (arrow A) of the recording light beam. In addition, in a temperature around room temperature, the reproducing layer 3*d*, the intermediate layer 3*e*, and the memory layer 3*f* are not brought into exchange coupling with each other, and since the memory layer 3*f* is the only perpendicular magnetic anisotropy film, the formed magnetic domain walls W1, W2, W3, W4, W5 and W6 are held only in the memory layer 3*f*.

Figure 4A:
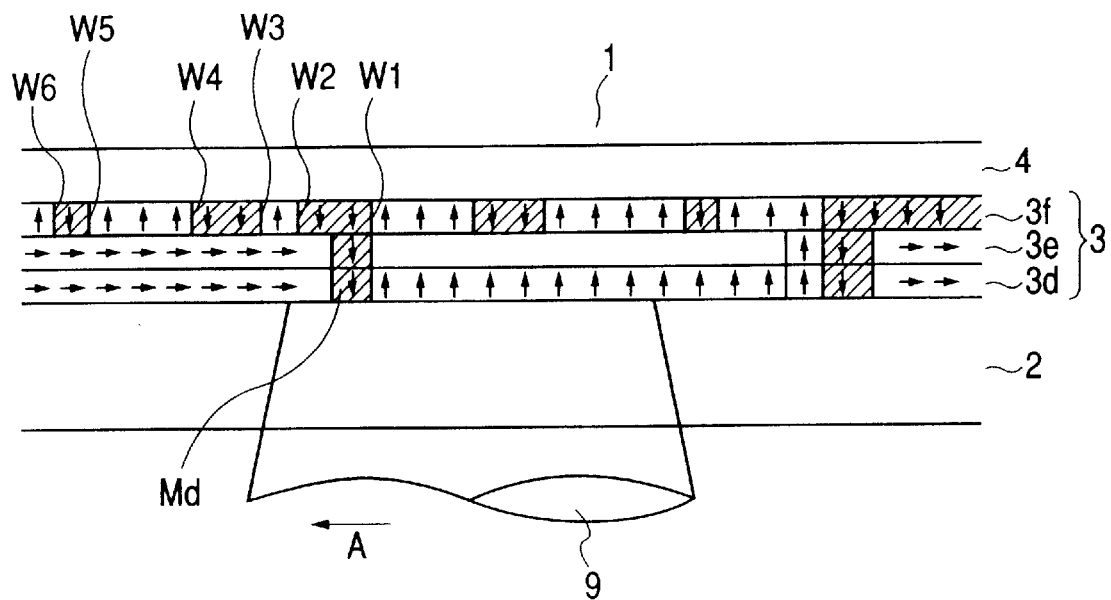
FIGS. 4A and 4B respectively illustrate in cross-section and plan views a method to reproduce information signals with the super-resolution reproducing system from the magnetic recording medium in which the information signals are recorded with the recording method of the present invention.
Figure 4B:
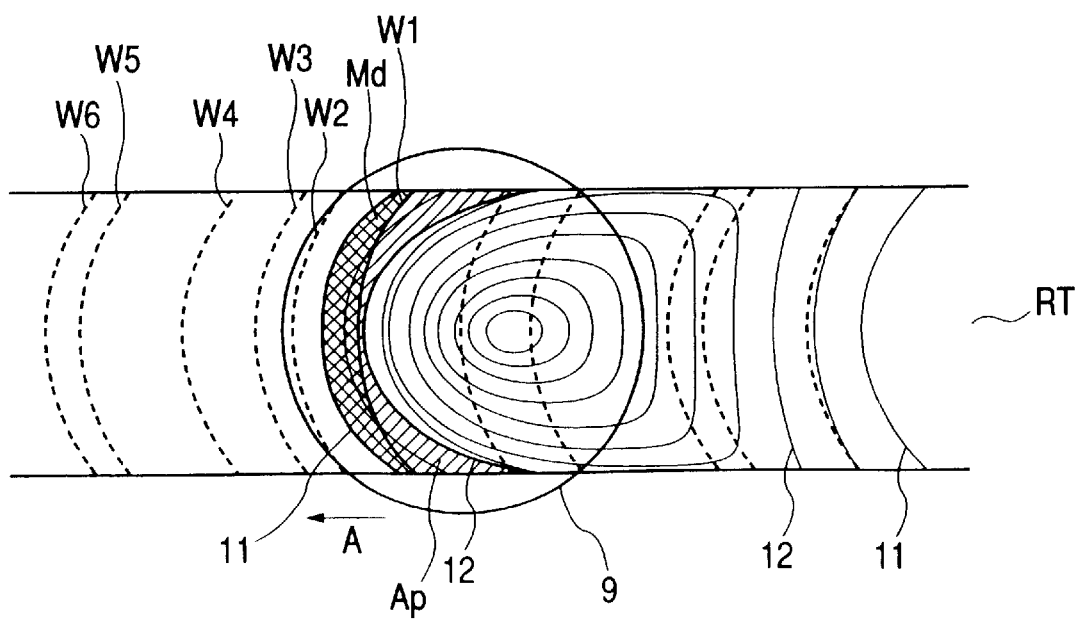

Next, a method for reproducing information signals from a magneto-optical medium 1 in which information signals are recorded with a reproducing apparatus by super resolution reproducing system will be described. The reproducing apparatus comprises driving means for an optical head, and magneto-optical medium 1. FIGS. 4A and 4B are partially enlarged view of the magneto-optical medium 1, showing a reproducing method of information signals according to the super resolution, reproducing system, where FIG. 4A is a cross-sectional view, and FIG. 4B is a plan view as viewed from the direction of a lower surface. At the time when information signals are reproduced, the optical head implements radiation by concentrating a low powered reproducing light beam 9 to a recording track RT through a substrate 2. At the same time, the driving means drives the magneto-optical medium 1, and thereby the reproducing light beam 9 scans the recording track RT in the direction indicated by an arrow A. The temperature of a magnetic layer 3 increases due to the radiation of the reproducing light beam 9, and in the periphery of the radiation region of the reproducing light beam 9, a thermal distribution, shown by an isothermal line in the drawing, is formed. Here, reference numeral 11 denotes an isothermal line of the temperature Tex when the intermediate layers 3*e* as well as the reproducing layers 3*d* are transformed from inter-surface magnetic films to perpendicular magnetic anisotropy films, and a reference numeral 12 denotes an isothermal line of the temperature Tci approximately equal to the curie temperature of the intermediate layer 3*e*. With the temperature being not more than Tex, the intermediate layer 3*e* as well as the reproducing layer 3*d* are both inter-surface magnetic films, and are not brought into exchange coupling with the memory 7 layer 3*f*.

Within the temperature range where the temperature is higher than Tex and lower than Tci, the intermediate layer 3*e* as well as the reproducing layer 3*d* will become perpendicular magnetic anisotropy films, and are mutually brought into exchange coupling with the memory layer 3*f*. Moreover, since the intermediate layer 3*e* loses magnetization with the temperature not less than Tci, the reproducing layer 3*d* is not brought into exchange coupling. That is, only in the region (aperture Ap) between the isothermal line 11, corresponding to the temperature Tex, and the isothermal line 12, corresponding to the temperature Tci, the reproducing layer 3*d*, the intermediate layer 3*e*, and the memory layer 3*f* are brought into exchange coupling, and magnetization as well as the magnetic domain wall of the memory layer Mare transcribed onto the reproducing layer 3*d*.

Here, in the forefront portion of the radiation region of the reproducing light beam 9, since lapse of time is still short from starting of temperature increase, influence of heat conductive proliferation to temperature distribution is small, and mainly energy distribution of the reproducing light beat 9 will influence the temperature distribution. Accordingly, even if the recording tracks RT are structured so that heat release from both side surfaces is restrained, the isothermal lines 11 and 12 will become shaped, as shown in FIG. 4B, as an arc which is bent convex in the same direction of scanning (arrow A) of the reproducing light beam 9. That is, the direction of bending in the forefront portions of the isothermal line 11 and 12 is the same as in the prior art shown by the reference numeral 30 in FIG. 9B. Incidentally, in the example shown in FIGS. 4A and 4B, in the trailing portion of the radiation region of the reproducing light beam 9, that is, the region which comes after the reproducing light beam has already passed the radiation region, as at the time of recording, mainly conductive proliferation of heat that has been accumulated mainly while the reproducing light beam was passing the region of the radiation of the reproducing light beam influences temperature distribution, and therefore the back portions of the isothermal lines 11 and 12 will become shaped as an arc which is bent convex in the same direction (that is in the opposite direction of the prior art) as the scanning direction (arrow A) of the reproducing light beam, but this little influences reproducing performance.

Here, in a position sufficiently remote from the radiation region of the reproducing light beam 9, the temperature of the magnetic layer 3 is low, and in this position, the reproducing layer 3*d*, the intermediate layer 3*e*, and the memory layer 3*f* are not brought into exchange coupling each other, and therefore the magnetic domain wall formed in the memory layer 3*f* does not undergo transcription into the reproducing layer 3*d*. However, in a location closer to the radiation region of the reproducing light beam 9, the temperature of the magnetic layer 3 increases, and subject to passing the forefront portion of the isothermal line 11 to enter the zinterior of the aperture Ap, the reproducing layer 3*d*, the intermediate layer 3*e*, and the memory layer 3*f* are mutually brought into exchange coupling, and thus the magnetic domain wall of the memory layer 3*f* (W1 in FIGS. 4A and 4B) together with the subsequent magnetization region Md, is transcribed into the reproducing layer 3*d*. Moreover, passing through the forefront portion of the isothermal line 12 to get out of the aperture Ap, the intermediate layer 3*e* loses magnetization so that the exchange coupling among the reproducing layer 3*d*, the intermediate layer 3*e*, and the memory layer 3*f* are cut out, and therefore magnetization as well as magnetic domain wall formed in the memory layer 3*f* is cut out and therefore magnetization as well as magnetic domain wall formed in the memory layer 3f are not transcribed into 3d.

Thus, every time a magnetic domain wall W1, W2, W3, W4, W5 and W6 formed in the memory layer 3f passes through the isothermal line 11 to enter the interior of the aperture Ap (sequentially), the magnetic domain wall and the subsequent magnetization region Md having magnetization upward and downward are alternately transcribed onto the reproducing layer 3d. A polarization direction of the reflecting light of the reproducing light beam from the magnetization region Md in accordance with the direction of magnetization of the magnetization region Md due to magneto-optics effect (Kerr effect). Rotation of such polarization direction is detected using an optical bead. With the magnetic domain wall as information signal domain being fanned at a position corresponding to the information signals to be stored, information signals can be reproduced based on the timing of changes in the signals.

Here, since the direction in which the recording light beam 7 as well as the reproducing light beam scan the recording tracks RT are normally the same, as shown in FIG. 3B and FIG. 4B, the formed magnetic domain wall is shaped as an arc which is bending convex in the same direction as the scanning direction (arrow A) of the recording light beam 7, and in the same direction as the bending direction of the forefront portion of the isothermal lines 11 as well as 12 fanned by the reproducing light beam 9. Thus, the magnetic domain wall in its entirety enters the interior of the aperture Ap formed by the reproducing light beam 9 approximately at the same time, to be transcribed together with the subsequent magnetization region Md into the reproducing layer 3d. Accordingly, changes in detection signals corresponding therewith are steep compared with the case where the magnetic domain wall is directed oppositely from the bending of the isothermal line, and as a result thereof jitter of the detection signals decreases and more exact reproduction of the information signals is feasible. In addition, even in the case where a forming interval of the magnetic domain walls is made short, unless a magnetic domain wall has entered the aperture Ap completely, no portion of the subsequent magnetic domain wall will enter the aperture Ap. As a result thereof, detection resolution capability is improved.

What is claimed is:

1. An information recording method for a domain wall displacement type magneto-optical medium, comprising the steps of:
    scanning the magneto-optical medium with a light beam so as to heat the magneto-optical medium;
    applying to a heated point of the magneto-optical medium a magnetic field modulated in accordance with information to be recorded; and
    controlling the scanning step and the magnetic field applying step so as to form a recording magnetic domain having an arc-shaped magnetic domain wall bending convex in a forward direction of scanning of said light beam.

2. The information recording method for a domain wall displacement type magneto-optical medium according to claim 1,
    wherein the magneto-optical recording medium has a plurality of recording tracks, and each recording track is magnetically separated from the other recording tracks.

3. An information recording apparatus for a domain wall displacement type magneto-optical medium, comprising:
    an optical head that irradiates a light beam on the magneto-optical medium so as to heat the magneto-optical medium;
    a magnetic head that applies to a heated point of the magneto-optical medium a magnetic field modulated in accordance with information to be recorded; and
    a spindle motor that causes relative movement between said optical head, said magnetic head and the magneto-optical medium so as to scan the light beam on the magneto-optical medium, and to form on the magneto-optical medium a recording magnetic domain having an arc-shape bending convex in a forward direction of scanning of the light beam.

* * * * *

UNITED STATES PATENT AND TRADEMARK OFFICE
CERTIFICATE OF CORRECTION

PATENT NO. : 6,614,731 B2
DATED : September 2, 2003
INVENTOR(S) : Kazuyoshi Ishii It is certified that error appears in the above-identified patent and that said Letters Patent is hereby corrected as shown below:

Column 2,
Line 23, "FIG. 8B" should read -- FIG. 8B, --.
Line 33, "line B" should read -- line 8 --.
Line 34, "temperature To," should read -- temperature Tc, --.
Line 37, "Tv." should read -- Tc. --.
Line 40, "coercively" should read -- coercivity --.
Line 44, "livid," should read -- field, --.
Line 45, "back RT" should read -- track RT, --.
Line 50, "fanned" should read -- formed --.

Column 3,
Line 9, "back WE" should read -- track RT --.
Line 49, "is" should read -- are --.

Column 4,
Line 10, "region MA" should read -- region Mex --.
Line 21, "ad" should read -- and --.
Line 32, "line 8," should read -- line 30, --.
Line 67, "baying" should read -- having --.

Column 5,
Line 10,"wit" should read -- with --.
Line 24, "fanned" should read -- formed -- .
Line 28, "Accordingly" should read -- According --.
Line 31, "radiate" should read -- radiates --.
Line 39, "views of" should read -- views --.

Column 6,
Line 59, "specially" should read -- spatially --, and "well" should read -- well as --.
Line 60, "its]" should read -- its --.
Line 61, "forte" should read -- for the --.

Column 7,
Line 3, "portent" should read -- percent --.
Line 7, "tacks RT;" should read -- tracks RT; --.
Line 46, "members" should read -- members having --.
Line 52, "only" should read -- only by --.
Line 61, "grooves C" should read -- grooves G --.

UNITED STATES PATENT AND TRADEMARK OFFICE
CERTIFICATE OF CORRECTION

PATENT NO. : 6,614,731 B2
DATED : September 2, 2003
INVENTOR(S) : Kazuyoshi Ishii It is certified that error appears in the above-identified patent and that said Letters Patent is hereby corrected as shown below:

Column 8,
Line 27, "racks RT" should read -- tracks RT --.
Line 34, "(thickness)" should read -- (thickness --.
Line 37, "he" should read -- the --.

Column 10,
Line 6, "fanned" should read -- formed --.
Line 20, "transfer formed" should read -- transfer-formed --.
Line 54, "rack RT," should read -- track RT, --.
Line 64, "the" should read -- of the --.

Column 11,
Line 34, "riot" should read -- not --.
Lines 53 and 67, "region Ma" should read -- region Mex --.
Line 55, "formed" should read -- formed. --.

Column 12,
Line 50, "fanned." should read -- formed. --.
Line 55, "fanned" should read -- formed --.

Column 13,
Line 24, "backs RT" should read -- tracks RT --.
Line 25, "dy" should read -- dry --.
Line 37, "continued." should read -- confirmed. --.
Line 48, "grooves C" should read -- grooves G --.
Line 65, "stops," should read -- steps, --.
Line 66, "Conned" should read -- formed --.

Column 14,
Line 1, "80J·m$^{-1}$s$^{-1}$K$^{-1}$" should read -- 80J·m$^{-1}$·s$^{-1}$·K$^{-1}$ --.
Line 4, "meted," should read -- method, --.
Line 8, "oft," should read -- of the --.
Line 20, "17 percent" should read -- 17 percent, --.
Line 52, "fonned" should read -- formed --.
Line 63, "being" should be deleted.

Column 15,
Line 14, "belt shaped" should read -- belt-shaped --
Line 15, "fonned" should read -- formed --.
Line 27, "fanned ante" should read -- formed on the --

UNITED STATES PATENT AND TRADEMARK OFFICE
CERTIFICATE OF CORRECTION

PATENT NO.    : 6,614,731 B2
DATED         : September 2, 2003
INVENTOR(S)   : Kazuyoshi Ishii It is certified that error appears in the above-identified patent and that said Letters Patent is hereby corrected as shown below:

Column 15 (cont'd),
Line 34, "magneto optical" should read -- magneto-optical --.
Line 36, "belt shaped" should read -- belt-shaped --.
Line 38, "Conned" should read -- formed --.
Line 39, "nude" should read -- made --.
Line 47, "fonned" should read -- formed --.
Line 53, "surface" should read -- surfaces --.
Line 55, "tracks UT" should read -- tracks RT --.
Line 56, "layer 6." should read -- layers 6. --.

Column 16,
Line 18, "layers M" should read -- layers 3f --.
Line 25, "3D" should read -- 3B --.
Line 26, "magneto optical" should read -- magneto-optical --.
Line 39, "fanned." should read -- formed --.
Line 56, "line S" should read -- line 8 --.
Line 61, "show" should read -- shown --.
Line 62, "S" should read -- 8 --.
Line 63, "In" should read -- in --.

Column 17,
Line 2, "heads" should read -- head's --.
Line 16, "an" should read -- in --.
Line 42, "view" should read -- views --.
Line 44, "resolution," should read -- resolution --.
Line 67, "7" should be deleted.

Column 18,
Line 13, "layer Mare" should read -- layer 3f are --.
Line 19, "beat" should read -- beam --.
Line 27, "line 11" should read -- lines 11 --.
Line 48, "coupling" should read -- coupling with --.
Line 55, "zinterior" should read -- interior --.
Line 67, "out" should read -- out, --.

UNITED STATES PATENT AND TRADEMARK OFFICE
CERTIFICATE OF CORRECTION

PATENT NO. : 6,614,731 B2
DATED : September 2, 2003
INVENTOR(S) : Kazuyoshi Ishii It is certified that error appears in the above-identified patent and that said Letters Patent is hereby corrected as shown below:

<u>Column 19,</u>
Line 11, "in" should read -- is in --.
Line 14, "bead." should read -- head. --.
Lines 16 and 27, "fanned" should read -- formed --.

Signed and Sealed this

Thirteenth Day of July, 2004

JON W. DUDAS
*Acting Director of the United States Patent and Trademark Office*